(12) United States Patent
Katakura

(10) Patent No.: US 8,031,410 B2
(45) Date of Patent: Oct. 4, 2011

(54) ZOOM LENS AND IMAGE PICKUP APPARATUS EQUIPPED WITH SAME

(75) Inventor: Masahiro Katakura, Chofu (JP)

(73) Assignee: Olympus Imaging Corp., Tokyo (JP)

( * ) Notice: Subject to any disclaimer, the term of this patent is extended or adjusted under 35 U.S.C. 154(b) by 39 days.

(21) Appl. No.: 12/462,999

(22) Filed: Aug. 11, 2009

(65) Prior Publication Data
US 2010/0046086 A1 Feb. 25, 2010

(30) Foreign Application Priority Data
Aug. 25, 2008 (JP) .................................. 2008-215613

(51) Int. Cl.
*G02B 15/14* (2006.01)
(52) U.S. Cl. ....................................... 359/682; 359/689
(58) Field of Classification Search .................. 359/680, 359/682–684, 689, 686, 676; 396/72–88; 348/240.99–240.3
See application file for complete search history.

(56) References Cited

U.S. PATENT DOCUMENTS

| | | | |
|---|---|---|---|
| 7,116,482 B2 | 10/2006 | Yang | |
| 7,593,166 B2 * | 9/2009 | Yoshitsugu et al. | 359/682 |
| 7,742,235 B2 * | 6/2010 | Yoshitsugu et al. | 359/682 |
| 7,817,350 B2 * | 10/2010 | Iiyama et al. | 359/689 |
| 2006/0152815 A1* | 7/2006 | Satori | 359/680 |
| 2007/0121219 A1 | 5/2007 | Kurioka et al. | |
| 2007/0285802 A1* | 12/2007 | Sugita | 359/689 |
| 2008/0043341 A1 | 2/2008 | Ori | |
| 2008/0247056 A1 | 10/2008 | Kurioka et al. | |
| 2008/0247057 A1 | 10/2008 | Kurioka et al. | |
| 2010/0045808 A1* | 2/2010 | Matsusaka et al. | 348/220.1 |

FOREIGN PATENT DOCUMENTS

| | | | |
|---|---|---|---|
| JP | HEI 2-27301 | | 1/1990 |
| JP | 2001-324676 | | 11/2001 |
| JP | 2005-92115 | | 4/2005 |
| JP | 2007-179015 | | 7/2007 |
| JP | 2008-015433 | | 1/2008 |
| JP | 2008-046529 | | 2/2008 |
| WO | WO2008075539 | * | 6/2008 |
| WO | WO 2009096155 A1 | * | 8/2009 |

* cited by examiner

*Primary Examiner* — Ricky Mack
*Assistant Examiner* — Zachary Wilkes
(74) *Attorney, Agent, or Firm* — Kenyon & Kenyon LLP

(57) ABSTRACT

A zoom lens includes, in order from its object side, a first lens unit having a negative refracting power, a second lens unit having a positive refracting power, and a third lens unit having a refracting power. During zooming from the wide angle end to the telephoto end, the distance between the first lens unit and the second lens unit decreases, the distance between the second lens unit and the third lens unit changes. The first lens unit includes, in order from the object side, a first lens element, which is a negative lens element, and a second lens element, which is a positive lens element. The negative lens element and the positive lens element satisfy specific conditions.

16 Claims, 15 Drawing Sheets

435.84 —·—·—
656.27 — — —
587.56 ———

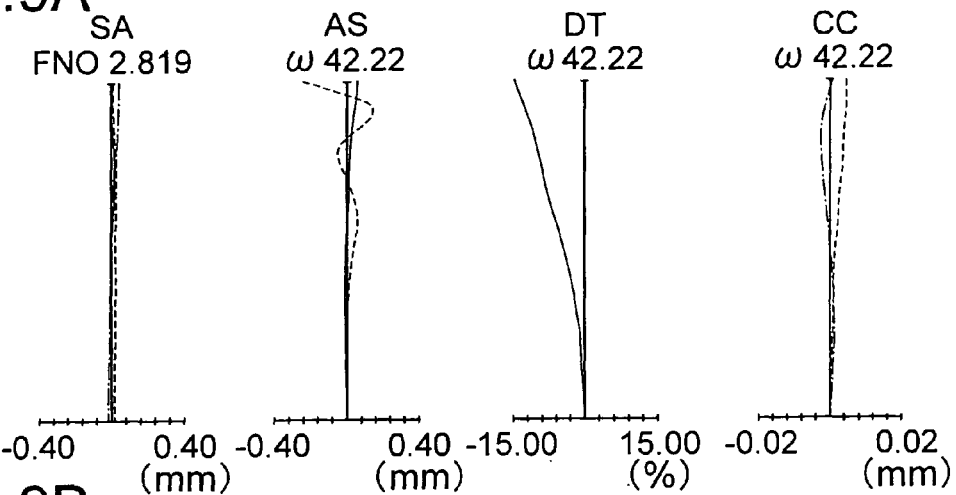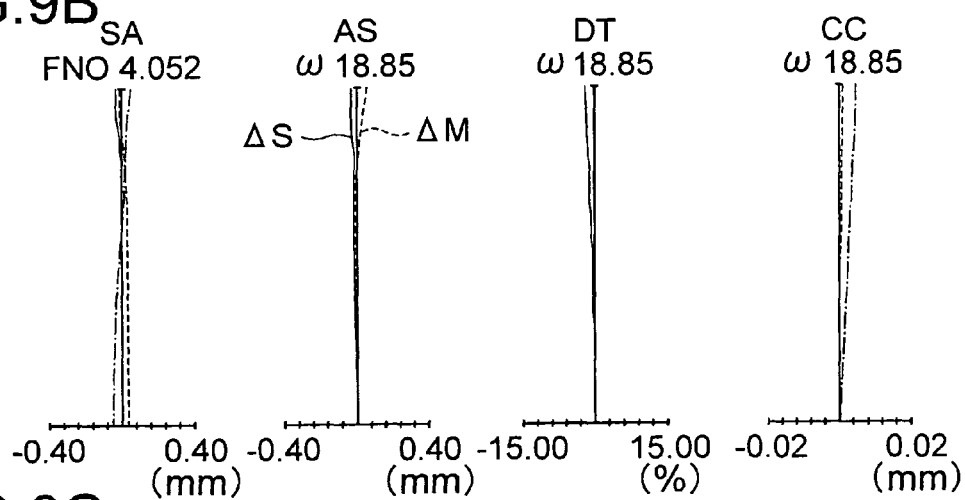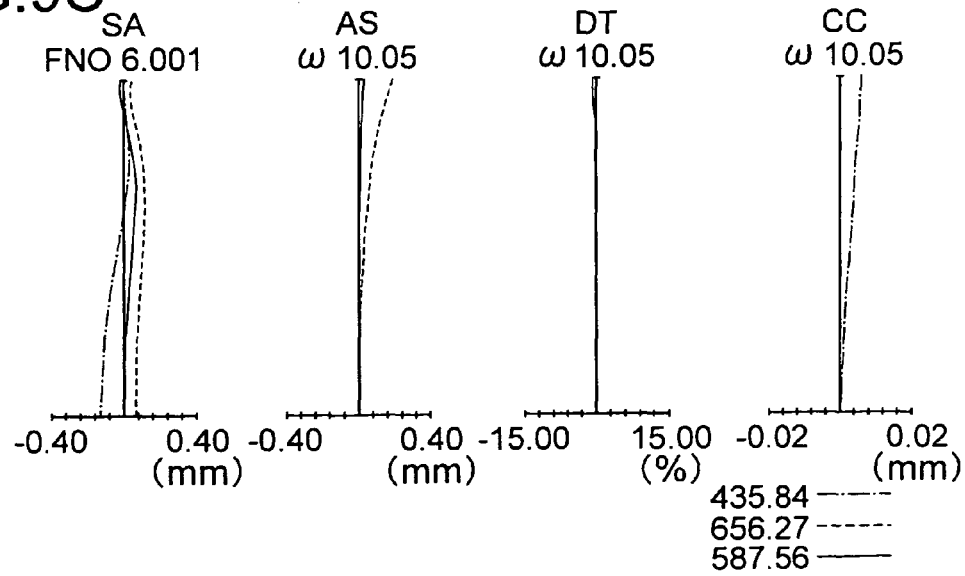

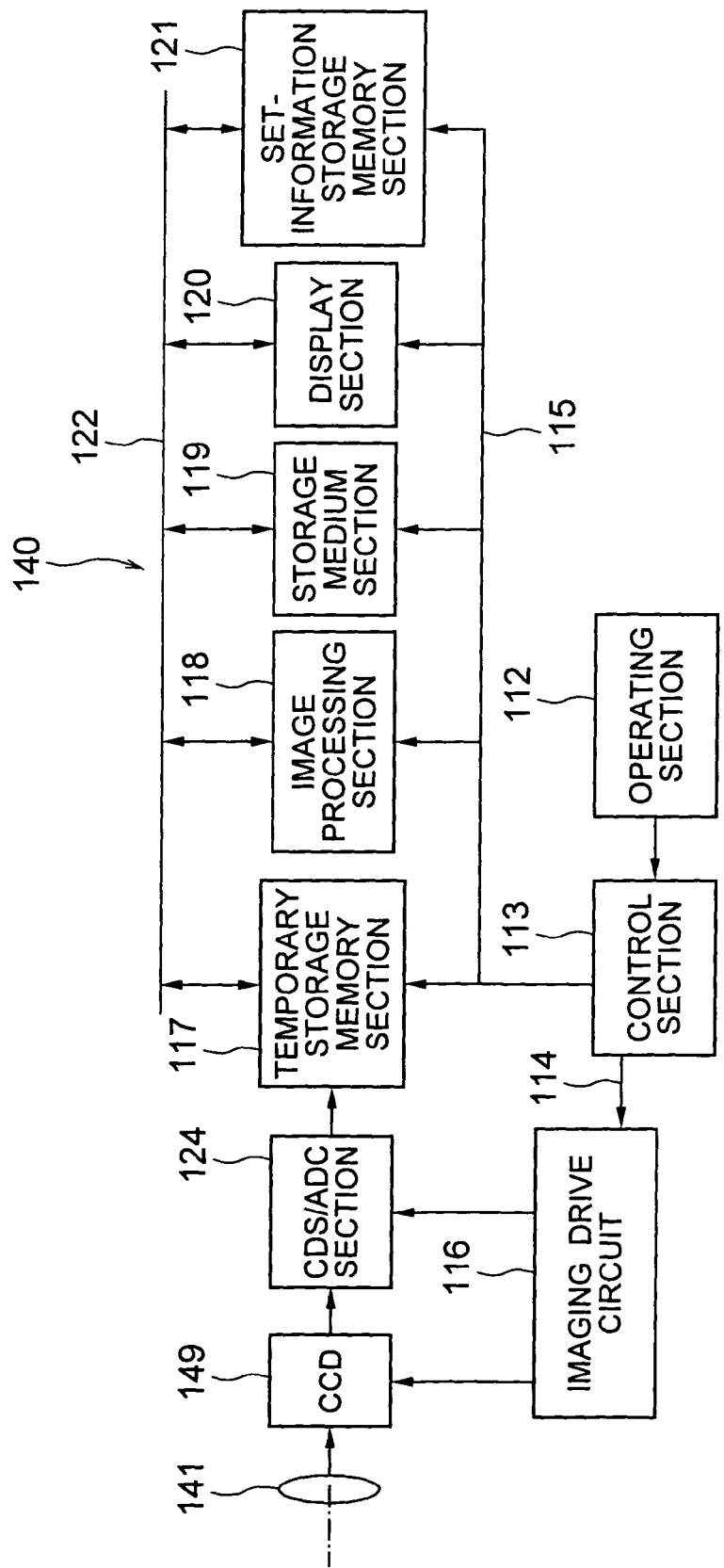

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2008-215613 filed on Aug. 25, 2008; the entire contents of which are incorporated herein by reference.

BACKGROUND OF THE INVENTION

1. Field of the Invention

The present invention relates to a zoom lens. The present invention further relates to an image pickup apparatus such as a digital camera equipped with a zoom lens.

2. Description of the Related Art

In recent years, digital cameras have replaced film cameras to become the mainstream in the technical field of the image pickup apparatus. Digital cameras have image pickup areas that are generally smaller in size than those of film cameras, and therefore a reduction in the size of digital cameras can be achieved more easily. Nowadays, since there is the trend that a higher importance is placed on the portability as compared to the past, the sizes of digital cameras have been made smaller.

Furthermore, since users of digital cameras wish to enjoy easy shooting in both indoor and outdoor shooting situations, increases in the angle of view and increases in the zoom ratio of zoom lenses used as the optical systems of digital cameras are needed. Various zoom lens have been developed in the past with a view to achieve a smallness in size, a wide angle of view, and a high zoom ratio.

For example, Japanese Patent Application Laid-Open Nos. 2008-46529 and 2007-179015 disclose negative-front type zoom lenses that have a lens unit having a negative refracting power disposed closest to the object side. This type of zoom lens is advantageous in achieving a large angle of view at the wide angle end, and advantageous also in reducing the overall size of the zoom lens because the size of the lens unit closest to the object side can be made small.

On the other hand, in order to achieve a further increase in the zoom ratio, a further inventive design is needed. In the cases of the zoom lenses disclosed in the aforementioned Japanese Patent Application Laid-Open Nos. 2008-46529 and 2007-179015, the refractive index of the positive lens in the first lens unit is low, and it cannot provide a sufficiently high positive refracting power. Otherwise, the positive lens in the first lens unit may need to have a high refractive index, which requires use of a material, such as diamond, that is low in availability and very hard to process.

Furthermore, since the negative lens in the first lens unit in these zoom lenses has a meniscus shape, if a further increase in the zoom ratio and/or angle of view is to be achieved, one surface of the negative lens in the first lens unit needs to have a strong negative refracting power, which is likely to lead particularly to increases in off-axis aberrations.

SUMMARY OF THE INVENTION

The present invention has been made in view of the above described problem and has as an object to provide a zoom lens that can easily be designed to have good optical performance in terms of both on-axis and off-axis aberrations while being advantageous in achieving a reduction in the size, an adequately large angle of view at the wide angle end, and a high zoom ratio.

A zoom lens according to a first aspect of the present invention comprises, in order from its object side:

a first lens unit having a negative refracting power;

a second lens unit having a positive refracting power; and a third lens unit having a refracting power, wherein during zooming from the wide angle end to the telephoto end, a distance between the first lens unit and the second lens unit decreases, a distance between the second lens unit and the third lens unit changes, the first lens unit comprises, in order from the object side, a first lens element, which is a negative lens element, and a second lens element, which is a positive lens element, and the negative lens element and the positive lens element satisfies the following conditional expressions (2) and (3):

$$2.01 < nd_{12} < 2.35 \quad (2)$$

$$18.58 < vd_{11} - vd_{12} < 50 \quad (3),$$

where $nd_{12}$ is a refractive index of the second lens element in the first lens unit for the d-line, $vd_{11}$ is an Abbe number of the first lens element in the first lens unit with respect to the d-line, and $vd_{12}$ is an Abbe number of the second lens element in the first lens unit with respect to the d-line.

An image pickup apparatus according to a second aspect of the present invention comprises:

the above-described zoom lens, and an image pickup element disposed on the image side of the zoom lens to convert an optical image formed by the zoom lens into an electrical signal.

BRIEF DESCRIPTION OF THE DRAWINGS

FIGS. 9A, 9B, and 9C are diagrams similar to FIGS. 6A, 6B, and 6C for the fourth embodiment in the state in which the zoom lens is focused on an object point at infinity.

FIG. 15 is a block diagram of an internal circuit of a principal portion of the digital camera.

DETAILED DESCRIPTION OF THE INVENTION

Figure 1A:
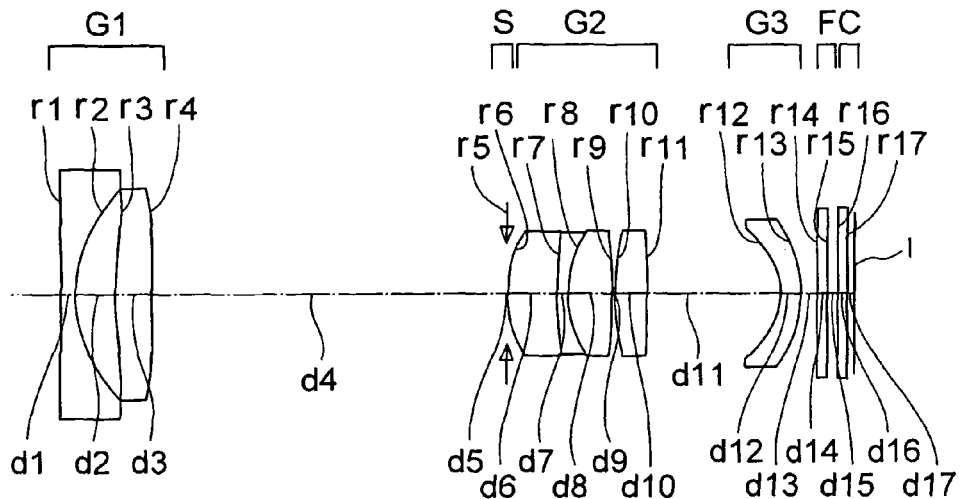
FIGS. 1A, 1B, and 1C are cross sectional views of a zoom lens according to a first embodiment of the present invention taken along its optical axis in the state in which the zoom lens is focused on a object point at infinity respectively at the wide angle end (FIG. 1A), in an intermediate state (FIG. 1B), and at the telephoto end (FIG. 1C)

A zoom lens according to the first aspect of the present invention includes, in order from the object side thereof, a first lens unit having a negative refracting power, a second lens unit having a positive refracting power, and a third lens unit having a refracting power, wherein during zooming from the wide angle end to the telephoto end, the distance between the first lens unit and the second lens unit decreases and the distance between the second lens unit and the third lens unit changes, the first lens unit includes, in order from the object side, a first lens element, which is a negative lens element, and a second lens element which is a positive lens element, and the negative lens element and the positive lens element satisfy the following conditional expressions (2) and (3); it is preferred, but not limited to, that conditional expression (1) be further satisfied:

$$1.85 < nd_{11} < 2.35 \quad (1),$$

$$2.01 < nd_{12} < 2.35 \quad (2), \text{ and}$$

$$18.58 < vd_{11} - vd_{12} < 50 \quad (3),$$

where $nd_{11}$ is the refractive index of the first lens element in the first lens unit for the d-line, $nd_{12}$ is the refractive index of the second lens element in the first lens unit for the d-line, $vd_{11}$ is the Abbe number of the first lens element in the first lens unit with respect to the d-line, and $vd_{12}$ is the Abbe number of the second lens element in the first lens unit with respect to the d-line.

In this zoom lens configuration, disposing the lens unit having a negative refracting power closest to the object side facilitates an increase in the angle of view and a reduction in the size of the zoom lens. In this zoom lens, zooming is performed by changing the distance between the first lens unit having a negative refracting power and the second lens unit having a positive refracting power. The zoom lens also has the third lens unit, and the lens effect of the third lens unit can be utilized. For example, in the case where the third lens unit has a positive refracting power, the position of the exit pupil can be made farther from the image plane. Conversely, in the case where the third lens unit has a negative refracting power, a reduction in the diameter of the first and second lens units is facilitated. Furthermore, the third lens unit may be adapted to move to reduce a change in the position of the exit pupil during zooming between the wide angle end and the telephoto end and/or to correct curvature of field. The third lens unit may be adapted to move to provide the magnification change.

Conditional expression (1) relates to the refractive index of the first lens element in the first lens unit for the d-line. When the first lens element satisfies conditional expression (1), the negative refracting power that is needed in the first lens unit to achieve an adequate angle of view and zoom ratio can easily be provided even if the absolute value of the curvature of the concave surface of the first lens element having a negative refracting power is designed to be small.

Conditional expression (2) relates to the refractive index of the second lens element in the first lens unit for the d-line. When the second lens element satisfies conditional expression (2), the positive refracting power that is needed in the first lens unit to achieve aberration correction can easily be provided even if the absolute value of the curvature of the convex surface of the second lens element having a positive refracting power is designed to be small.

If these conditional expressions are satisfied, it is possible to suppress, in particular, curvature of field at the wide angle end and spherical aberration at the telephoto end. If one or both of the lower limits of conditional expressions (1) and (2) are not exceeded, a reduction in curvature of field at the wide angle end and spherical aberration at the telephoto end is facilitated. If one or both of the upper limits of conditional expressions (1) and (2) are not exceeded, use can be made of materials that are easily available and easy to machine.

Conditional expression (3) relates to the Abbe numbers of the first lens element and the second lens element in the first lens unit with respect to the d-line. If conditional expression (3) is satisfied, good correction of on-axis chromatic aberration and chromatic aberration of magnification generated by the first lens unit is facilitated. In particular in the case where a high zoom ratio is aimed at, the first and second lens elements that satisfy conditional expression (3) enable suppression of chromatic aberration at the telephoto end. If the lower limit of conditional expression (3) is not exceeded, a reduction in chromatic aberration at the wide angle end and the telephoto end is facilitated. If the upper limit of conditional expression (3) is not exceeded, use can be made of materials that are available at lower cost.

It is more preferred that the following modifications (1') or (1''), (2') or (2''), and (3') or (3'') of conditional expressions (1), (2) and (3), having more limited upper and lower limit values, be satisfied.

$$1.85 < nd_{11} < 2.0 \quad (1')$$

$$1.85 < nd_{11} < 1.9 \quad (1'')$$

$$2.015 < nd_{12} < 2.20 \quad (2')$$

$$2.019 < nd_{12} < 2.11 \quad (2'')$$

$$19.1 < vd_{11} - vd_{12} < 35 \quad (3')$$

$$23.0 < vd_{11} - vd_{12} < 25 \quad (3'')$$

Only the upper limit or lower limit of these modifications may be applied.

In the zoom lens according to the present invention, it is preferred that the first lens element have a shape that satisfies the following conditional expression (4):

$$0.2 < (r_{1a} + r_{1b})/(r_{1a} - r_{1b}) < 1.0 \quad (4),$$

where $r_{1a}$ is the paraxial radius of curvature of the object side lens surface of the first lens element, and $r_{1b}$ is the paraxial radius of curvature of the image side lens surface of the first lens element.

Conditional expression (4) relates to a preferred shape of the first lens element or the negative lens element in the first lens unit. If conditional expression (4) is satisfied, the negative refracting power can be shared excellently among the object side surface and the image side surface of the first lens element, which facilitates a reduction in curvature of field at the wide angle end and chromatic aberration at the telephoto end. Specifically, if neither the lower limit nor the upper limit of conditional expression (4) is exceeded, the paraxial radius of curvature of either the object side surface or the image side surface of the negative lens element can be made small, whereby correction of curvature of field at the wide angle end and spherical aberration at the telephoto end is facilitated.

It is more preferred that the following modification (4') or (4") of conditional expression (4), having more limited upper and lower limit values, be satisfied.

$$0.5 < (r_{1a} + r_{1b})/(r_{1a} - r_{1b}) < 0.98 \quad (4')$$

$$0.7 < (r_{1a} + r_{1b})/(r_{1a} - r_{1b}) < 0.97 \quad (4'')$$

Only the upper limit or lower limit of these modifications may be applied.

In the zoom lens according to the present invention, it is preferred that the third lens unit move during zooming from the wide angle end to the telephoto end in such a way as to satisfy the following conditional expression (5):

$$1.05 < \beta(t)/\beta(w) < 2.0 \quad (5),$$

where $\beta(w)$ is the lateral magnification of the third lens unit at the wide angle end, and $\beta(t)$ is the lateral magnification of the third lens unit at the telephoto end.

Conditional expression (5) specifies a preferred condition that relates to the change in the lateral magnification of the third lens unit. To achieve a high zoom ratio, it is preferred that the third lens unit also provide the magnification changing effect as well as the second lens unit. If conditional expression (5) is satisfied, the third lens unit can provide the magnification changing effect, which facilitates a relative reduction in the refracting power of the second lens unit. This is advantageous particularly in reducing spherical aberration or decreasing the entire length of the zoom lens.

It is preferred that the lower limit of conditional expression (5) be not exceeded so that the third lens unit provides an appropriate magnification changing effect. If the upper limit of conditional expression (5) is not exceeded, the movement amount of the third lens unit can easily be made smaller, which facilitates a reduction in the size of the driving mechanism.

It is more preferred that the following modification (5') or (5") of conditional expression (5), having more limited upper and lower limit values, be satisfied.

$$1.1 < \beta(t)/\beta(w) < 1.5 \quad (5')$$

$$1.3 < \beta(t)/\beta(w) < 1.4 \quad (5'')$$

Only the upper limit or lower limit of these modifications may be applied.

In the case where the zoom lens is equipped with a focusing mechanism, the conditional expressions (5), (5'), and (5") presented above should be regarded as conditions in the state in which the zoom lens is focused on an object at the farthest distance. This is also the case with the conditional expressions among the other conditional expressions presented in the foregoing and the following that contain a term(s) that changes upon focusing operation.

It is preferred that the number of lens elements in the third lens unit be one.

If the third lens unit is composed of one lens element, cost reduction and slimming of the zoom lens in the state in which the lens barrel is collapsed are facilitated.

In the zoom lens according to the present invention, it is preferred that the second lens unit include at least two positive lens elements and one negative lens element.

If the second lens unit is composed of at least two positive lens elements and one negative lens element, the positive refracting power can be shared among the positive lens elements, and aberrations can be cancelled by the negative lens element, whereby a reduction in aberrations is facilitated.

In the zoom lens according to the present invention, it is preferred that the second lens unit include a cemented lens in which a plurality of lens elements are cemented together on the optical axis.

In the case where the second lens unit includes a cemented lens, misalignment of optical axes of lens elements can be prevented more advantageously than in the case where the lens elements in the cemented lens are separated into single lens elements. In addition, by selecting materials of the lens elements in the cemented lens, correction of chromatic aberration can be achieved.

In the zoom lens according to the present invention, it is preferred that the lens surface closest to the object side in the second lens unit be an aspheric surface.

Use of the aspheric surface as the lens surface closest to the object side of the second lens unit enables good correction of spherical aberration among others.

In the zoom lens according to the present invention, it is preferred that the first lens unit be composed two lens elements including, in order from the object side, the first lens element and the second lens element, and the following conditional expression (6) be satisfied:

$$-3.0 < (r_{2a} + r_{2b})/(r_{2a} - r_{2b}) < -1.2 \quad (6),$$

where $r_{2a}$ is the paraxial radius of curvature of the object side lens surface of the second lens element in the first lens unit, and $r_{2b}$ is the paraxial radius of curvature of the image side lens surface of the second lens element in the first lens unit.

The first lens unit composed of two lens elements is advantageous in reducing the cost. Conditional expression (6) relates to a preferred shape of the second lens element in the first lens unit.

If conditional expression (6) is satisfied, the angle of incidence of rays on the two lens surfaces of the second lens can be made moderately small, which is advantageous in correcting off-axis aberrations such as curvature of field. If neither the lower limit nor the upper limit of conditional expression (6) is exceeded, correction of off-axis aberrations at the wide angle end is facilitated.

It is more preferred that the following modification (6') or (6") of conditional expression (6), having more limited upper and lower limit values, be satisfied.

$$-2.8 < (r_{2a} + r_{2b})/(r_{2a} - r_{2b}) < -1.7 \quad (6')$$

$$-2.6 < (r_{2a} + r_{2b})/(r_{2a} - r_{2b}) < -2.0 \quad (6'')$$

Only the upper limit or lower limit of these modifications may be applied.

In the zoom lens according to the present invention, it is preferred that the second lens element in the first lens unit have an aspheric surface, and the first lens unit satisfy the following conditional expression (7):

$$-2.9 < P_{11}/P_{12} < -1.5 \quad (7),$$

where $P_{11}$ is the refracting power of the first lens element in the first lens unit, and $P_{12}$ is the refracting power of the second lens element in the first lens unit.

Conditional expression (7) relates to appropriate relationship between the refracting powers of the positive lens element and the negative lens element in the first lens unit. If conditional expression (7) is satisfied, the relationship between the refracting powers of the positive lens element and the negative lens element can be optimized, and correction of off-axis aberrations such as curvature of field and coma generated by the first lens unit is facilitated. Therefore, significant deterioration in the optical performance of the zoom lens can be prevented even if the angle of view is made larger or the zoom ratio is made higher.

Designing the negative lens element to have such a moderately weak negative refracting power that the lower limit of conditional expression (7) is not exceeded facilitates a reduction in, primarily, off-axis aberrations. Designing the negative lens element to have such a power that the upper limit of conditional expression (7) is not exceeded facilitates a reduction in the size of the zoom lens.

It is more preferred that the following modification (7') or (7") of conditional expression (7), having more limited upper and lower limit values, be satisfied.

$$-2.7 < P_{11}/P_{12} < -2.0 \qquad (7')$$

$$-2.6 < P_{11}/P_{12} < -2.3 \qquad (7'')$$

Only the upper limit or lower limit of these modifications may be applied.

In the zoom lens according to the present invention, it is preferred that the following conditional expression (8) be satisfied:

$$3.8 < f_t/f_w < 10 \qquad (8),$$

where $f_w$ is the focal length of the zoom lens at the wide angle end, and $f_t$ is the focal length of the zoom lens at the telephoto end.

Conditional expression (8) relates to a preferred zoom ratio of the zoom lens. If the zoom lens is designed to have such a high zoom ratio that the lower limit of conditional expression (8) is not exceeded, the advantageous effects of the present invention can be enjoyed. If the upper limit of conditional expression (8) is not exceeded, a reduction in the size and cost of the zoom lens is facilitated, and good optical performance can easily be achieved.

It is more preferred that the following modification (8') or (8") of conditional expression (8), having more limited upper and lower limit values, be satisfied.

$$4.1 < f_t/f_w < 8.0 \qquad (8')$$

$$4.4 < f_t/f_w < 5.0 \qquad (8'')$$

Only the upper limit or lower limit of these modifications may be applied.

In the zoom lens according to the present invention, it is preferred that the third lens unit have a positive refracting power.

If the third lens has a positive refracting power, a zoom lens having the exit pupil that is distant from the image plane can be provided. This is advantageous in achieving good image quality in the case where a common image pickup element is used with it.

In the zoom lens according to the present invention, it is preferred that the third lens unit have a negative refracting power and be located closer to the object side at the telephoto end of the zoom range than at the wide angle end.

The third lens unit having a negative refracting power is advantageous in reducing the diameters of the first and second lens units. If the third lens unit has a negative refracting power, it is easy to design the third lens unit to have the function of a field flattener. If the third lens unit is located closer to the object side at the telephoto end than at the wide angle end, the third lens unit can provide the magnification increasing effect, which leads to a reduction in the entire length of the zoom lens.

In the zoom lens according to the present invention, if the third lens unit has a negative refracting power, it is preferred that the third lens unit satisfy the following conditional expression:

$$0.1 < G_{m3}/D_t < 0.6 \qquad (9),$$

where $G_{m3}$ is the movement amount of the third lens unit during zooming from the wide angle end to the telephoto end, wherein movement toward the object side is represented by positive a value, and $D_t$ is the entire length of the zoom lens at the telephoto end.

Conditional expression (9) specifies a preferred condition concerning the movement amount of the third lens unit and the entire length of the zoom lens at the telephoto end. If conditional expression (9) is satisfied, the third lens unit having a negative refracting power can be designed to provide an appropriate magnification changing effect.

If the lower limit of conditional expression (9) is not exceeded, the third lens unit can provide an appropriate magnification changing effect, which is advantageous in achieving the magnification change and in reducing variations in aberrations. If the upper limit of conditional expression (9) is not exceeded, the amount of movement of the third lens unit is made moderately small, which facilitates a reduction in the size of the apparatus including the moving mechanism.

It is more preferred that the following modification (9') or (9") of conditional expression (9), having more limited upper and lower limit values, be satisfied.

$$0.2 < G_{m3}/D_t < 0.5 \qquad (9')$$

$$0.3 < G_{m3}/D_t < 0.4 \qquad (9'')$$

Only the upper limit or lower limit of these modifications may be applied.

In the zoom lens according to the present invention, it is preferred that the second lens unit be composed of three positive lens elements and one negative lens element.

By this configuration, the positive refracting power is shared among the three positive lens elements, and having the negative lens element facilitates correction of spherical aberration and chromatic aberration.

In the zoom lens according to the present invention, it is preferred that anti-reflection coating be applied on at least one surface of a lens among the lenses that constitute the zoom lens. This facilitates an improvement in image quality by a reduction in ghost images and flare.

An image pickup apparatus according to a second aspect of the present invention includes the zoom lens as described in the foregoing and an image pickup element that is disposed on the image side of the zoom lens and converts an optical image formed by the zoom lens into an electrical signal. By this configuration, there can be provided an image pickup apparatus having a good balance among an increase in the angle of view, an increase in the zoom ratio, and a reduction in the size.

It is preferred that the image pickup apparatus according to the present invention be provided with an image transformation section that transforms, by image processing, an electrical signal representing an image containing distortion attributed to the zoom lens into an image signal representing an image in which distortion is corrected.

By this configuration, images can be recorded or displayed after they have been electrically corrected in terms of distortion attributed to the zoom lens. Therefore, the zoom lens is allowed to have distortion. This is advantageous in achieving correction of curvature of field and coma. In consequence, good image quality can easily be achieved by a small-size zoom lens.

It is preferred that the image pickup apparatus according to the present invention be provided with an image transformation section that transforms, by image processing, an electrical signal representing an image containing chromatic aberration of magnification attributed to the zoom lens into an image signal representing an image in which chromatic aberration of magnification is corrected.

It is also preferred that the image pickup apparatus according to the present invention be provided with an image transformation section that transforms, by image processing, an electrical signal representing an image formed by the zoom lens into an image signal representing an image in which color misregistration attributed to chromatic aberration of magnification is corrected. By electrically correcting chromatic aberration of magnification attributed to the zoom lens, images having better image quality can be obtained.

Furthermore, since the zoom lens is allowed to have chromatic aberration of magnification, a sufficient degree of freedom in selecting the lens material can be ensured. This is advantageous in reducing the cost, in slimming the zoom lens, and in achieving good performance.

In each of the conditional expressions presented above, only one of the upper and lower limit values thereof may be replaced by another upper or lower limit value. It is more preferred that two or more of the above-described conditions and features, which may be selected arbitrarily, be adopted at the same time. For each of the conditional expressions, only the upper limit value or the lower limit value of the more preferred numerical range limitation defined by a corresponding modified conditional expression may be applied. Furthermore, the various features described above may be adopted in any possible combination.

According to the present invention, there can be provided a zoom lens that can easily be designed to have good optical performance and is advantageous in achieving smallness in size, a wide angle of view, and a high zoom ratio. Furthermore, there can be provided a zoom lens that is suitable for use with an image pickup element that can pick up good quality images even if the angle of incidence of rays in the peripheral region in the image pickup area of the image pickup element is large. Still further, there can be provided a small size image pickup apparatus equipped with such a zoom lens.

In the following, embodiments of the zoom lens and the image pickup apparatus according to the present invention will be described in detail with reference to the drawings. It should be understood, however, that the present invention is not limited by the embodiments.

In the following, first to fifth embodiments of the zoom lens according to the present invention will be described. FIGS. 1A, 1B and 1C to 5A, 5B and 5C are cross sectional views of the zoom lenses according to the first to the fifth embodiments respectively at the wide angle end (FIGS. 1A, 2A, 3A, 4A, and 5A), in an intermediate focal length state (FIGS. 1B, 2B, 3B, 4B, and 5B), and at the telephoto end (FIGS. 1C, 2C, 3C, 4C, and 5C) in the state in which the zoom lenses are focused on an object point at infinity. In FIGS. 1A through 5C, a first lens unit is denoted by G1, a second lens unit is denoted by G2, an aperture stop is denoted by S, a third lens unit is denoted by G3, a plane parallel plate having wavelength range restriction coating applied thereon that blocks or reduces infrared light, constituting a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have the function of a low pass filter.

In all the embodiments, the aperture stop S moves integrally with the second lens unit G2. All the numerical data presented below are for the state in which the zoom lens is focused on an object at infinity. In the numerical data, dimensions are in mm (millimeters) and angles are in degrees. In all the embodiments, focusing is performed by moving the third lens unit G3. Focusing may be performed by moving the first lens unit G1. This will be effective in the case where the sensitivity of focusing to the movement of the third lens unit G3 is too high or too low. Zoom data will be presented for the wide angle end (WE), the intermediate focal length state (ST) defined in connection with the present invention, and the telephoto end (TE).

Figure 1B:
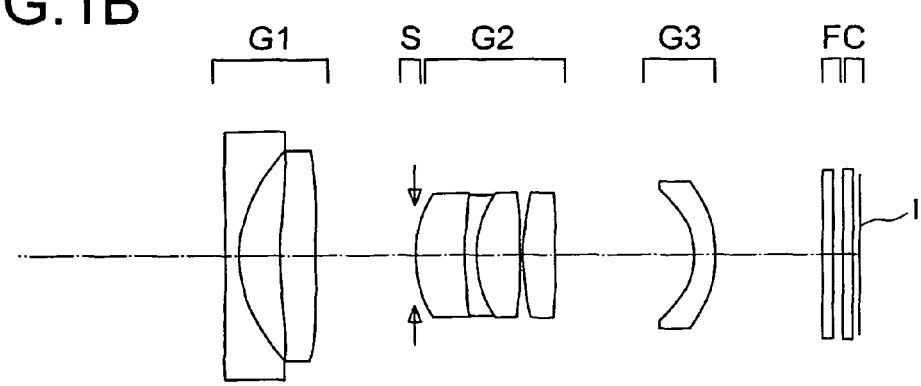
Figure 1C:
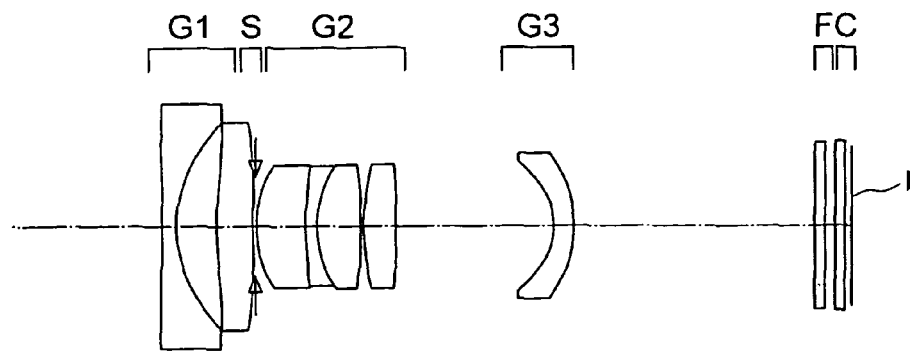

As shown in FIGS. 1A, 1B, and 1C, the zoom lens according to the first embodiment includes, in order from the object side thereof, a first lens unit G1 having a negative refracting power, an aperture stop S, a second lens unit G2 having a positive refracting power, and a third lens unit G3 having a negative refracting power.

During zooming from the wide angle end to the telephoto end, the first lens unit G1 moves first toward the image side and thereafter toward the object side, the second lens unit G2 moves toward the object side, and the third lens unit G3 moves toward the object side.

The first lens unit G1 is composed of a biconcave negative lens and a positive meniscus lens having a convex surface directed toward the object side. The second lens unit G2 is composed of a cemented lens made up of a positive meniscus lens having a convex surface directed toward the object side, a negative meniscus lens having a convex surface directed toward the object side, and a biconvex positive lens, and a biconvex positive lens. The third lens unit G3 is composed of a negative meniscus lens having a convex surface directed toward the image side. All the lens elements in each lens unit G1, G2, G3 are arranged in the mentioned order from the object side.

The following six lens surfaces are aspheric surfaces: both surfaces of the biconcave lens in the first lens unit G1, both surfaces of the positive meniscus lens in the first lens unit G1, the object side surface of the positive meniscus lens in the second lens unit G2, and the object side surface of the negative meniscus lens in the third lens unit G3.

Figure 2A:
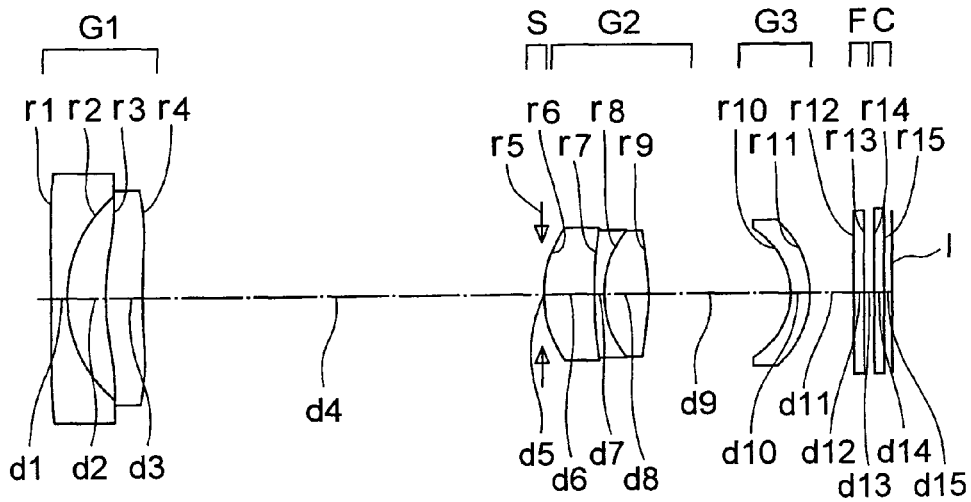
FIGS. 2A, 2B, and 2C are cross sectional views similar to FIGS. 1A, 1B, and 1C showing a zoom lens according to a second embodiment of the present invention.
Figure 2B:
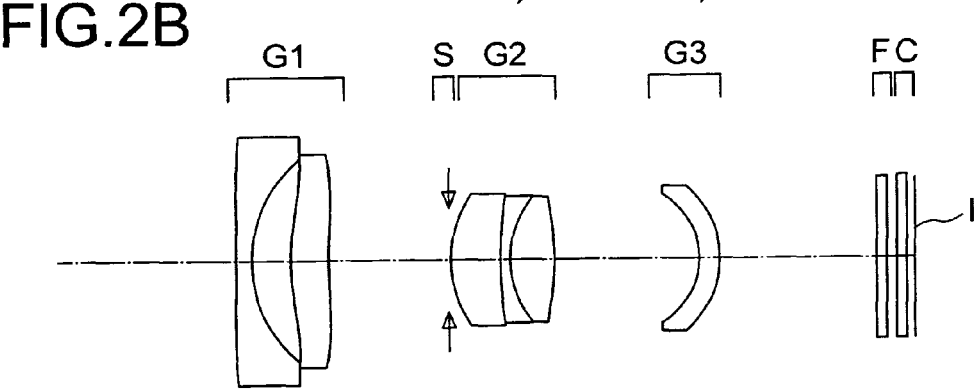
Figure 2C:
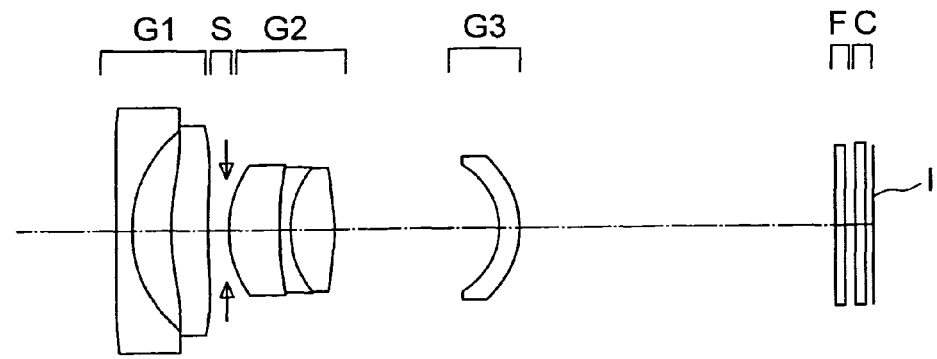

As shown in FIGS. 2A, 2B, and 2C, the zoom lens according to the second embodiment includes, in order from the object side thereof, a first lens unit G1 having a negative refracting power, an aperture stop S, a second lens unit G2 having a positive refracting power, and a third lens unit G3 having a negative refracting power.

During zooming from the wide angle end to the telephoto end, the first lens unit G1 moves first toward the image side and thereafter toward the object side, the second lens unit G2 moves toward the object side, and the third lens unit G3 moves toward the object side.

The first lens unit G1 is composed of a biconcave negative lens and a positive meniscus lens having a convex surface directed toward the object side. The second lens unit G2 is composed of a cemented lens made up of a positive meniscus lens having a convex surface directed toward the object side, a negative meniscus lens having a convex surface directed toward the object side, and a biconvex positive lens. The third lens unit G3 is composed of a negative meniscus lens having a convex surface directed toward the image side. All the lens elements in each lens unit G1, G2, G3 are arranged in the mentioned order from the object side.

The following seven lens surfaces are aspheric surfaces: both surfaces of the biconcave lens in the first lens unit G1, both surfaces of the positive meniscus lens in the first lens unit G1, the object side surface of the positive meniscus lens in the second lens unit G2, the image side surface of the biconvex positive lens in the second lens unit G2, and the object side surface of the negative meniscus lens in the third lens unit G3.

Figure 3A:
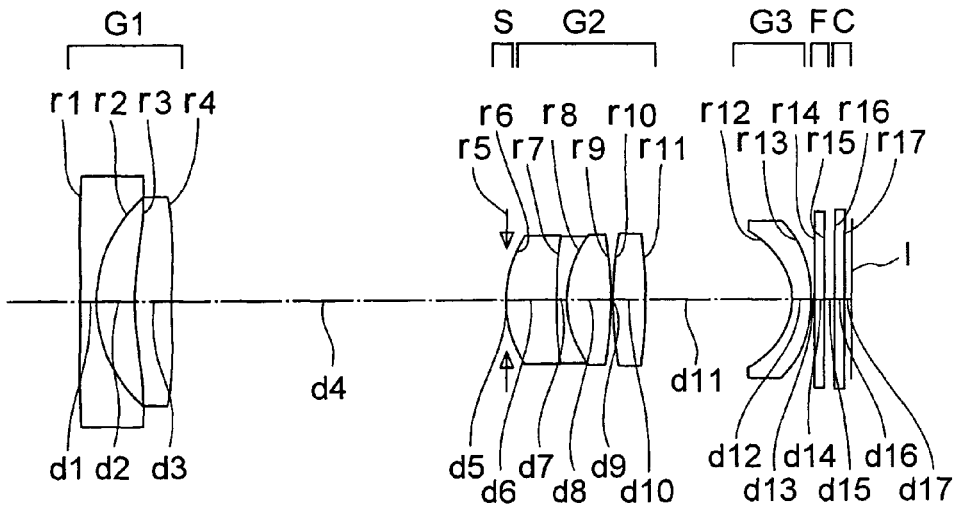
FIGS. 3A, 3B, and 3C are cross sectional views similar to FIGS. 1A, 1B, and 1C showing a zoom lens according to a third embodiment of the present invention.
Figure 3B:
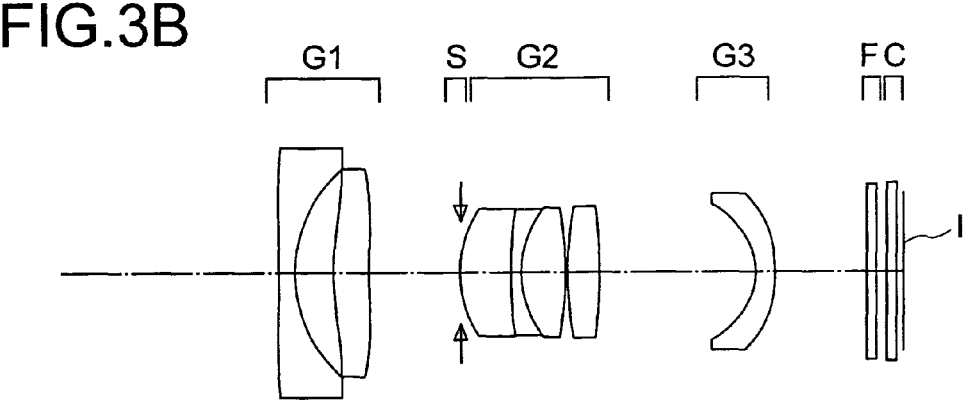
Figure 3C:
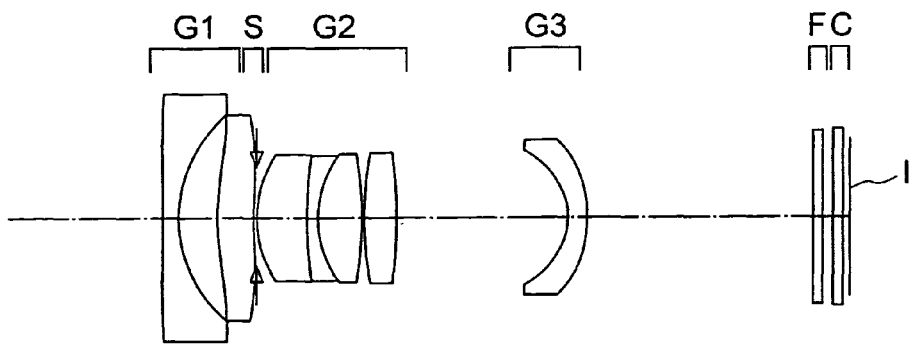

As shown in FIGS. 3A, 3B, and 3C, the zoom lens according to the third embodiment includes, in order from the object side thereof, a first lens unit G1 having a negative refracting power, an aperture stop S, a second lens unit G2 having a positive refracting power, and a third lens unit G3 having a negative refracting power.

During zooming from the wide angle end to the telephoto end, the first lens unit G1 moves first toward the image side and thereafter toward the object side, the second lens unit G2 moves toward the object side, and the third lens unit G3 moves toward the object side.

The first lens unit G1 is composed of a biconcave negative lens and a positive meniscus lens having a convex surface directed toward the object side. The second lens unit G2 is composed of a cemented lens made up of a positive meniscus lens having a convex surface directed toward the object side, a negative meniscus lens having a convex surface directed toward the object side, and a biconvex positive lens, and a biconvex positive lens. The third lens unit G3 is composed of a negative meniscus lens having a convex surface directed toward the image side. All the lens elements in each lens unit G1, G2, G3 are arranged in the mentioned order from the object side.

The following seven lens surfaces are aspheric surfaces: both surfaces of the biconcave lens in the first lens unit G1, both surfaces of the positive meniscus lens in the first lens unit G1, the object side surface of the positive meniscus lens in the second lens unit G2, the image side surface of the biconvex positive lens in the second lens unit G2, and the object side surface of the negative meniscus lens in the third lens unit G3.

Figure 4A:
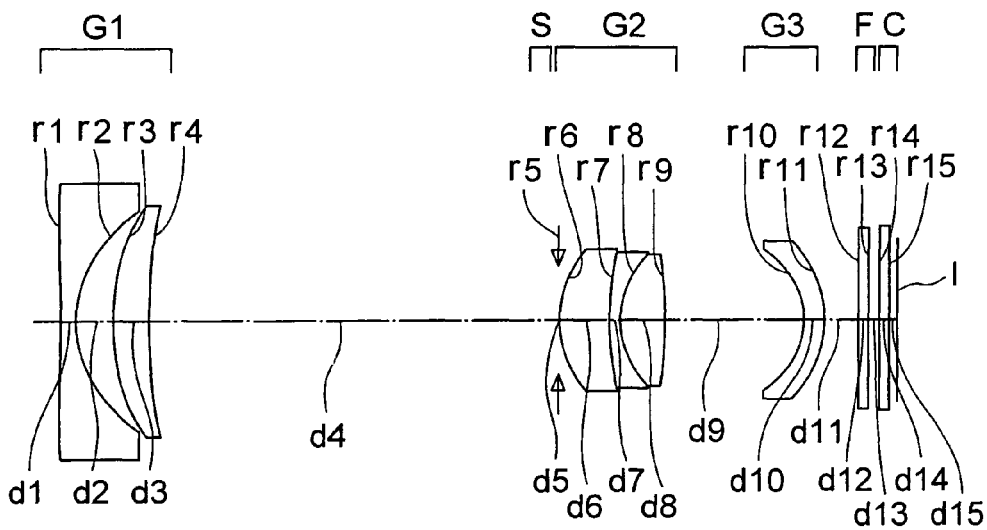
FIGS. 4A, 4B, and 4C are cross sectional views similar to FIGS. 1A, 1B, and 1C showing a zoom lens according to a fourth embodiment of the present invention.
Figure 4B:
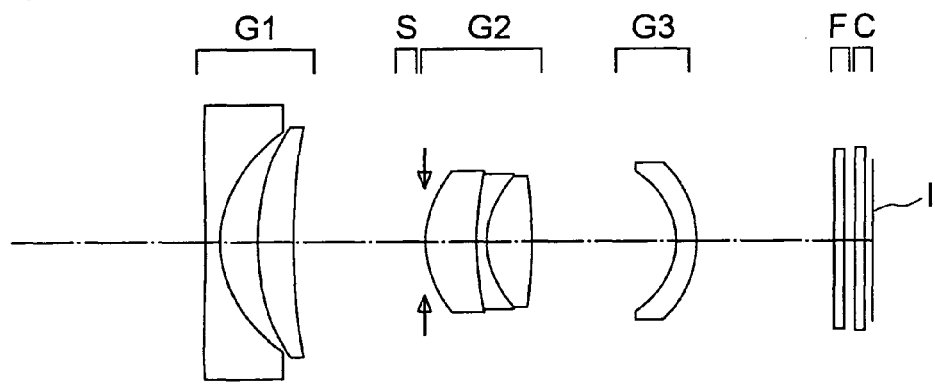
Figure 4C:
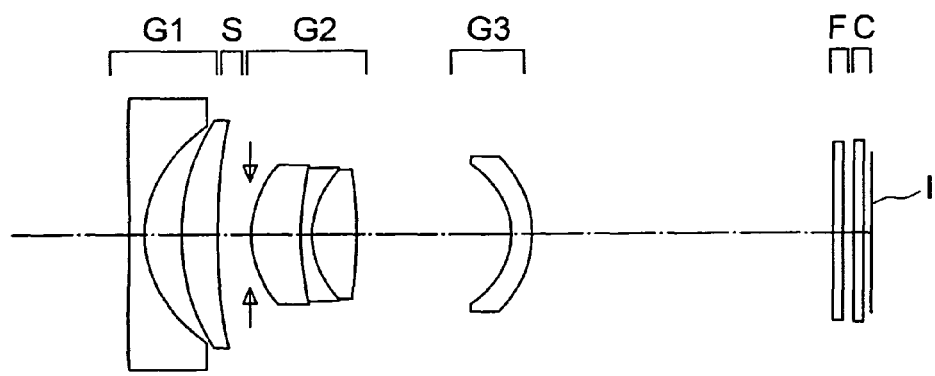

As shown in FIGS. 4A, 4B, and 4C, the zoom lens according to the fourth embodiment includes, in order from the object side thereof, a first lens unit G1 having a negative refracting power, an aperture stop S, a second lens unit G2 having a positive refracting power, and a third lens unit G3 having a negative refracting power.

During zooming from the wide angle end to the telephoto end, the first lens unit G1 moves first toward the image side and thereafter toward the object side, the second lens unit G2 moves toward the object side, and the third lens unit G3 moves toward the object side.

The first lens unit G1 is composed of a biconcave negative lens and a positive meniscus lens having a convex surface directed toward the object side. The second lens unit G2 is composed of a cemented lens made up of a positive meniscus lens having a convex surface directed toward the object side, a negative meniscus lens having a convex surface directed toward the object side, and a biconvex positive lens. The third lens unit G3 is composed of a negative meniscus lens having a convex surface directed toward the image side. All the lens elements in each lens unit G1, G2, G3 are arranged in the mentioned order from the object side.

The following seven lens surfaces are aspheric surfaces: both surfaces of the biconcave lens in the first lens unit G1, both surfaces of the positive meniscus lens in the first lens unit G1, the object side surface of the positive meniscus lens in the second lens unit G2, the image side surface of the biconvex positive lens in the second lens unit G2, and the object side surface of the negative meniscus lens in the third lens unit G3.

Figure 5A:
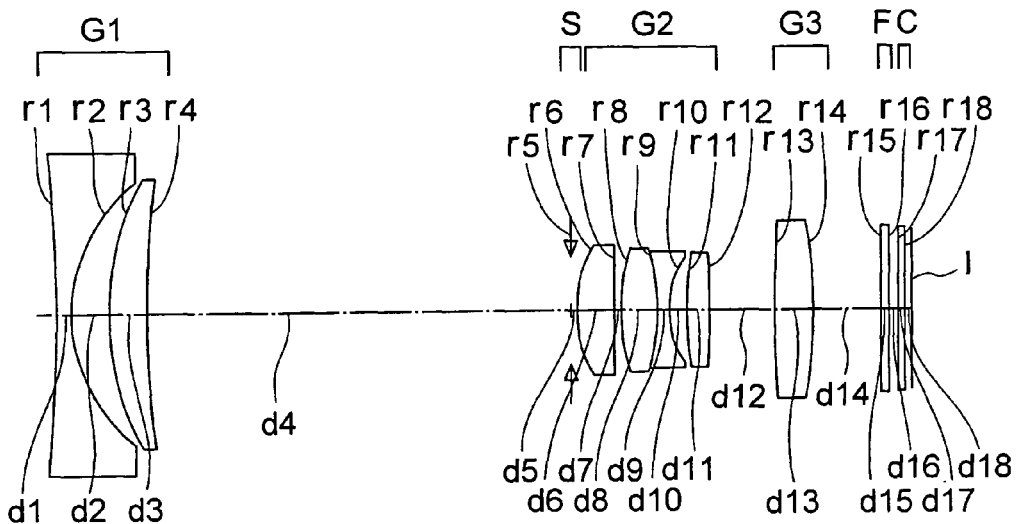
FIGS. 5A, 5B, and 5C are cross sectional views similar to FIGS. 1A, 1B, and 1C showing a zoom lens according to a fifth embodiment of the present invention.
Figure 5B:
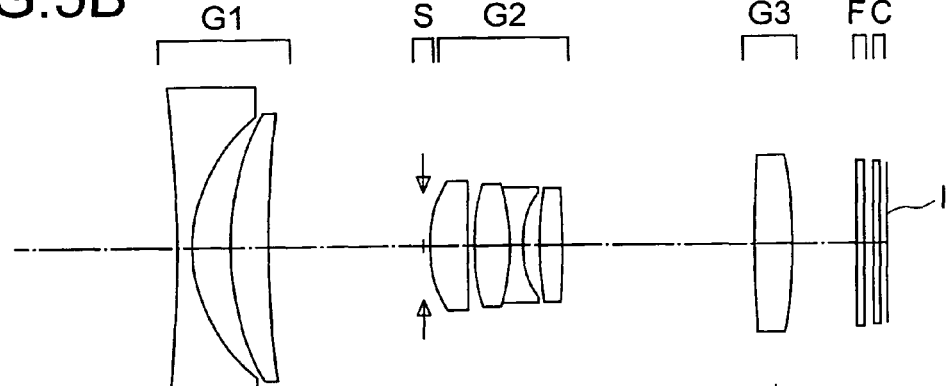
Figure 5C:
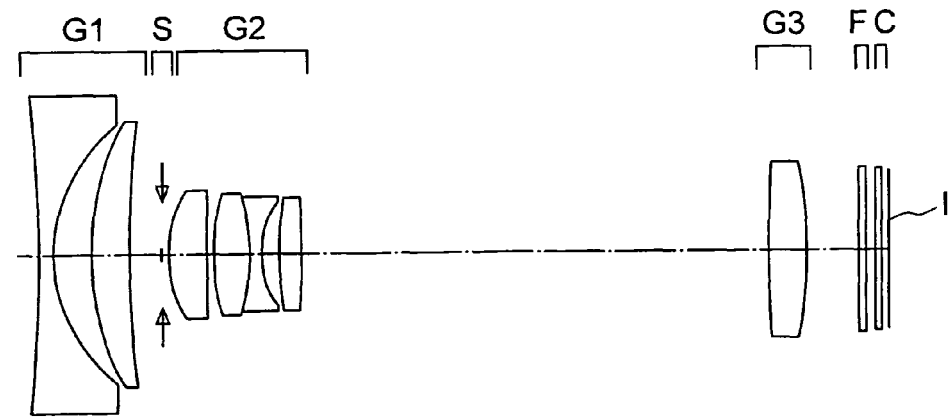
Figure 6A:
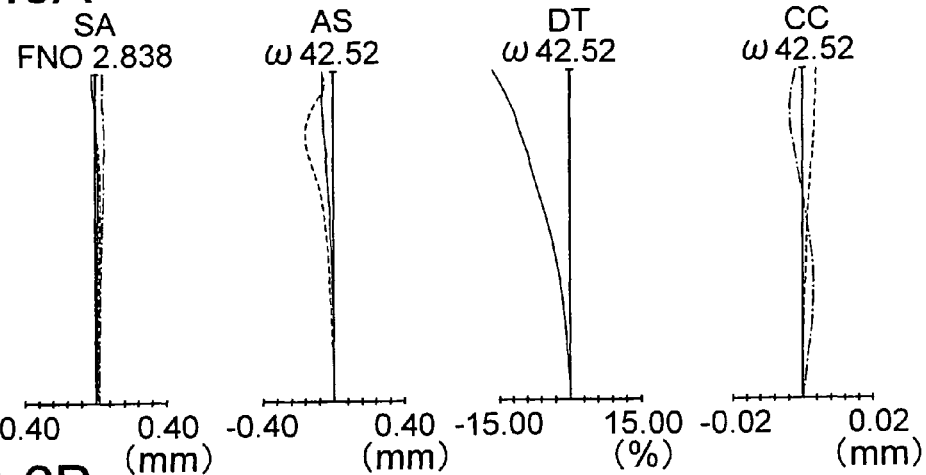
FIGS. 6A, 6B, and 6C are diagrams showing spherical aberration, astigmatism, distortion, and chromatic aberration of magnification of the first embodiment in the state in which the zoom lens is focused on an object point at infinity respectively at the wide angle end (FIG. 6A), in the intermediate state (FIG. 6B), and at the telephoto end (FIG. 6C).
Figure 6B:
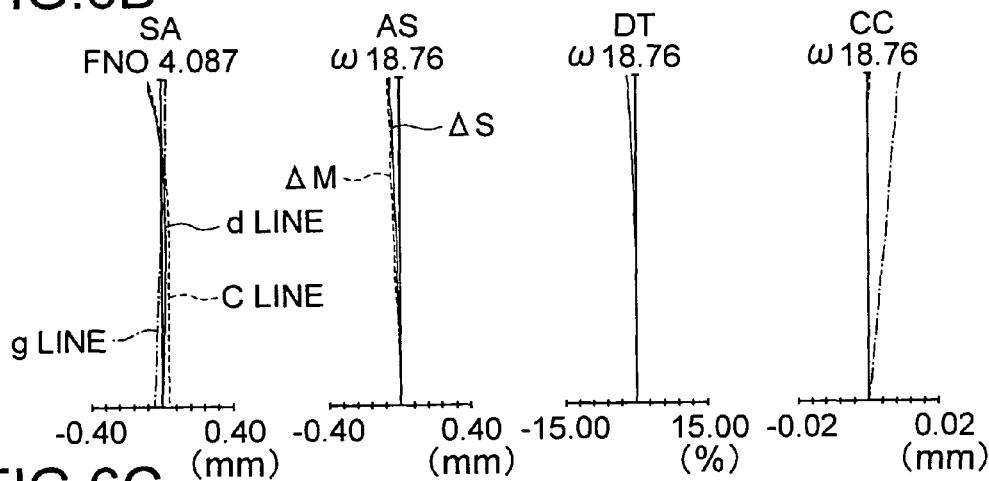
Figure 6C:
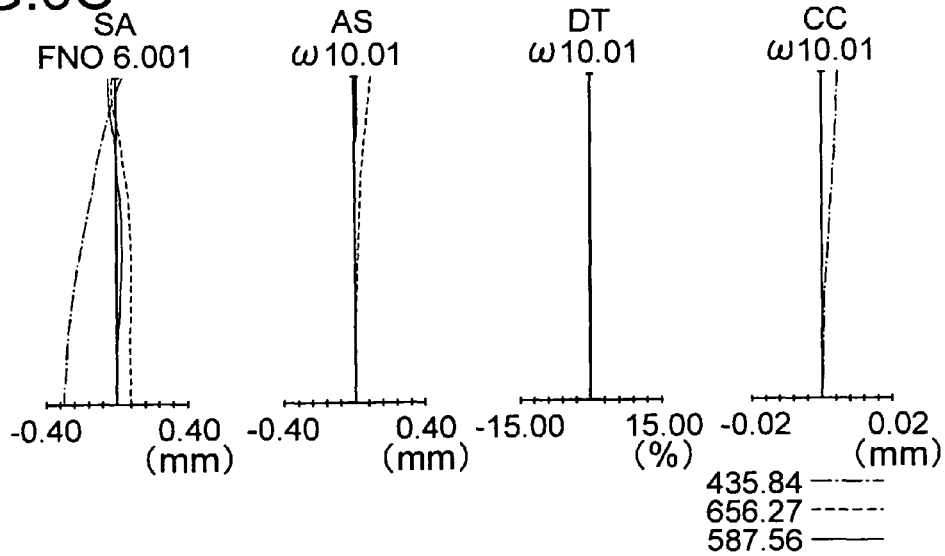
Figure 7A:
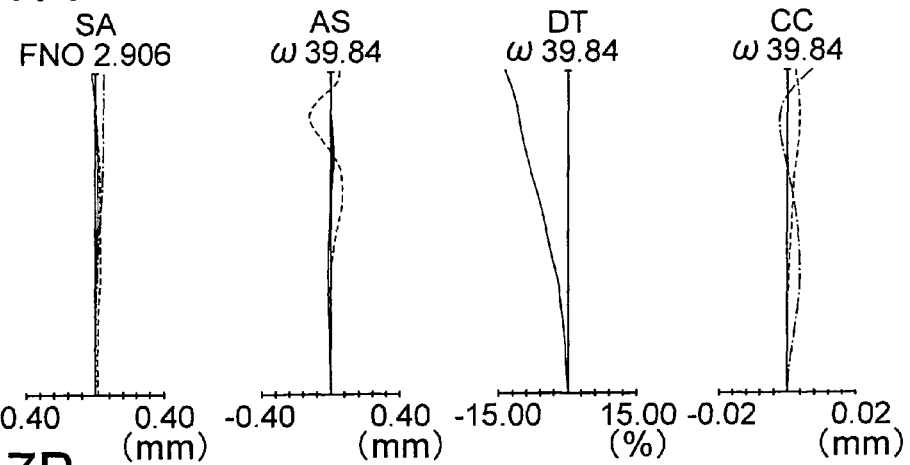
FIGS. 7A, 7B, and 7C are diagrams similar to FIGS. 6A, 6B, and 6C for the second embodiment in the state in which the zoom lens is focused on an object point at infinity.
Figure 7B:
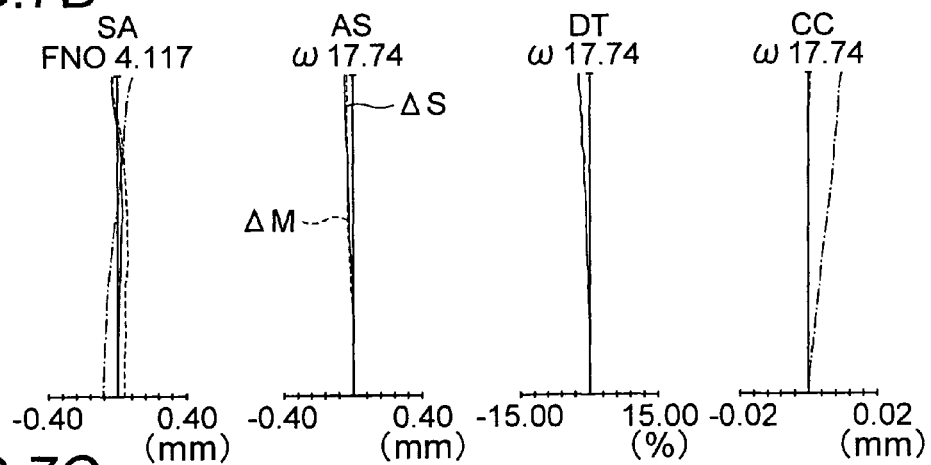
Figure 7C:
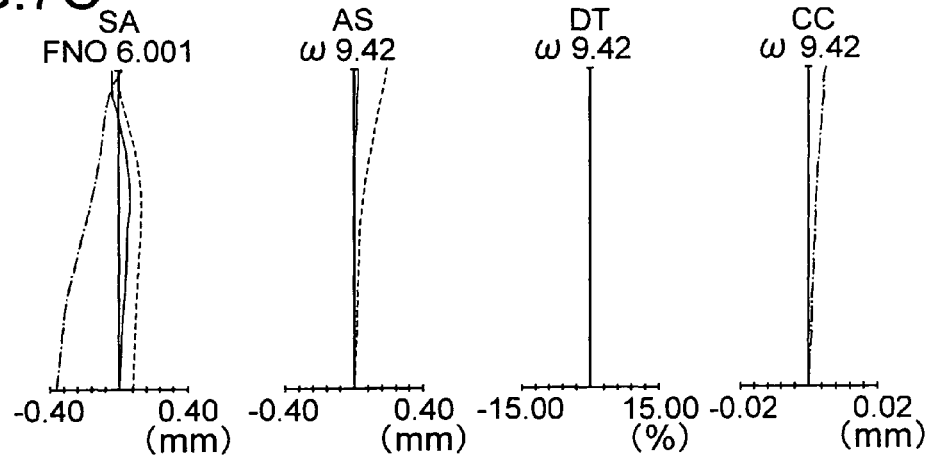
Figure 8A:
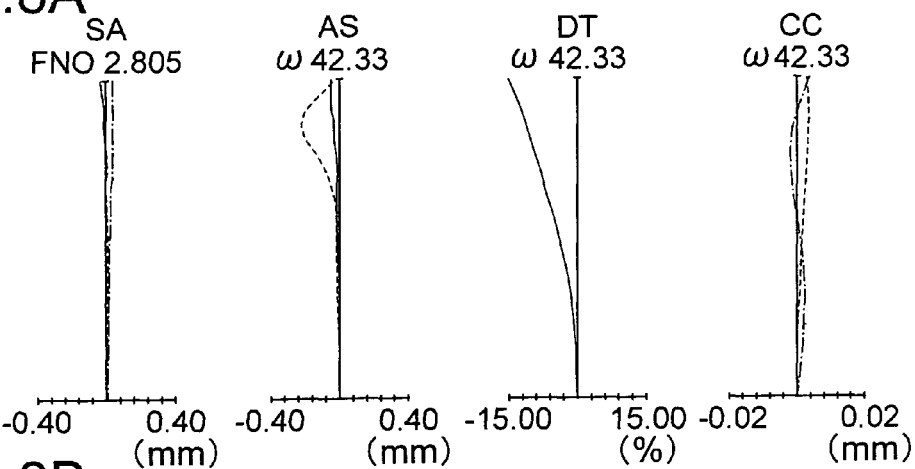
FIGS. 8A, 8B, and 8C are diagrams similar to FIGS. 6A, 6B, and 6C for the third embodiment in the state in which the zoom lens is focused on an object point at infinity.
Figure 8B:
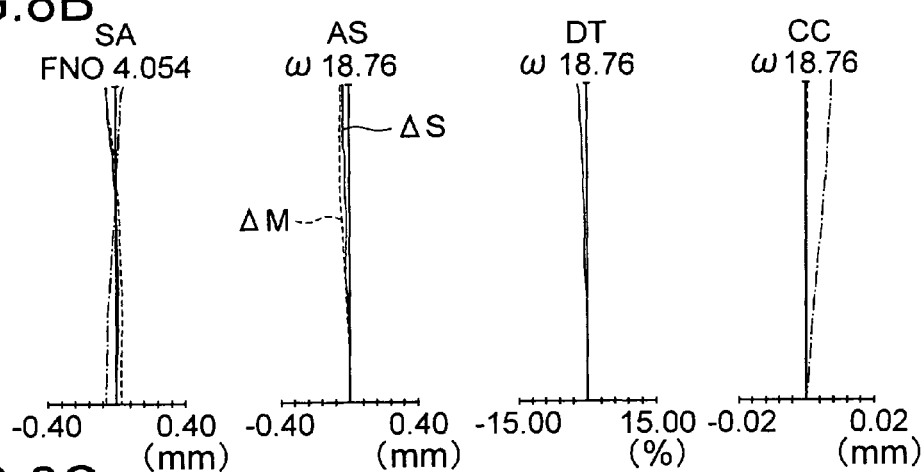
Figure 8C:
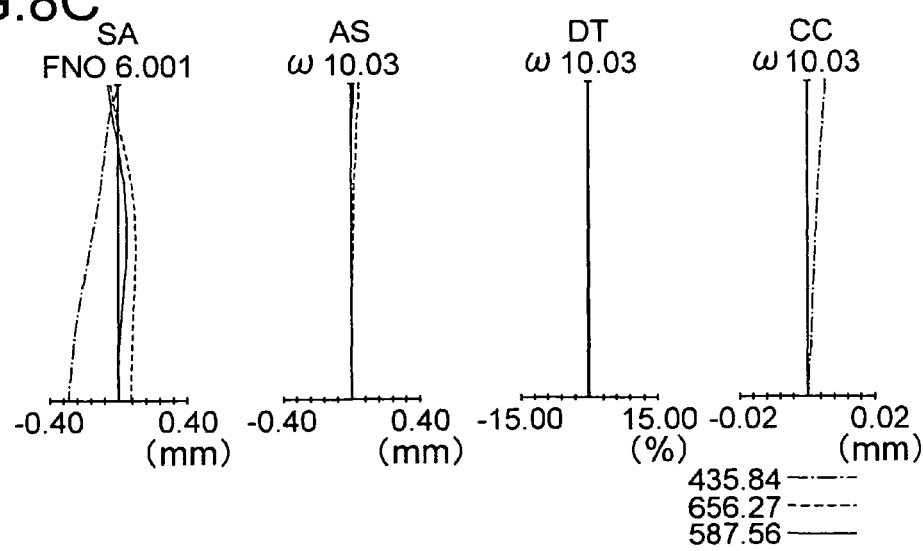
Figure 10A:
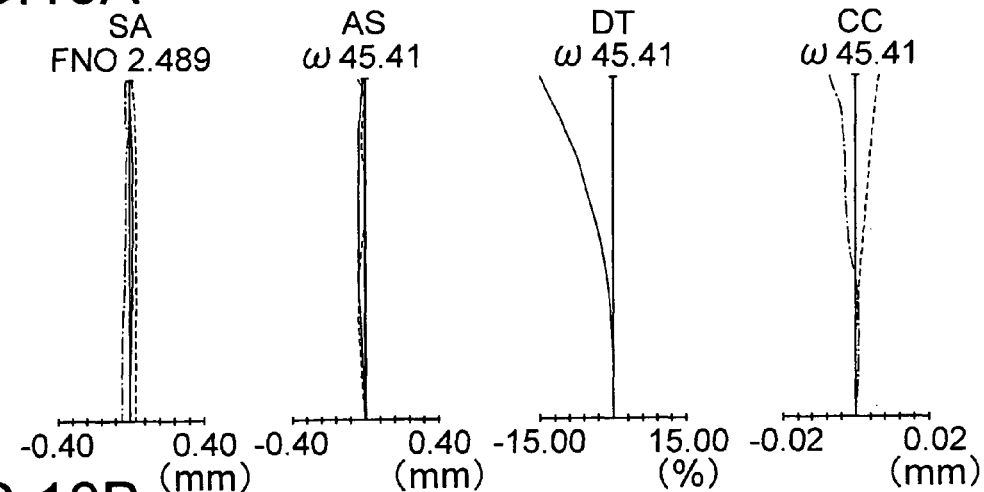
FIGS. 10A, 10B, and 10C are diagrams similar to FIGS. 6A, 6B, and 6C for the fifth embodiment in the state in which the zoom lens is focused on an object point at infinity.
Figure 10B:
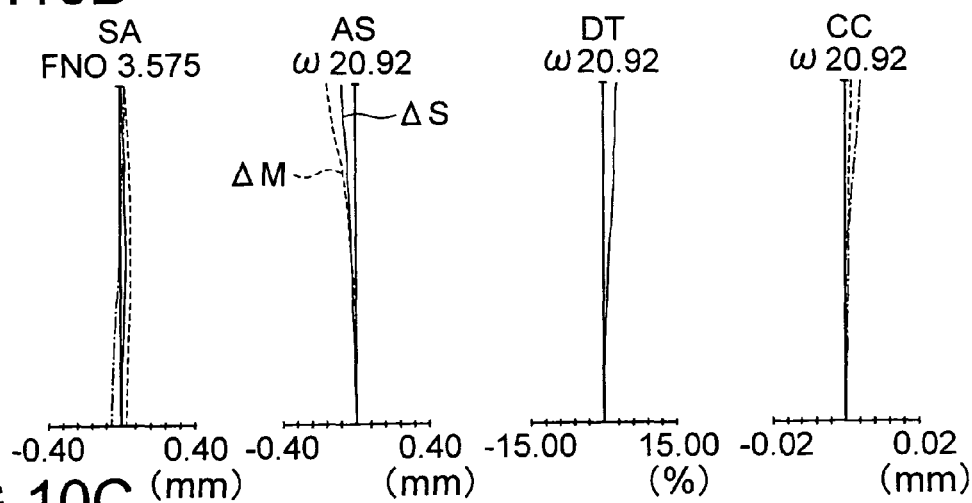
Figure 10C:
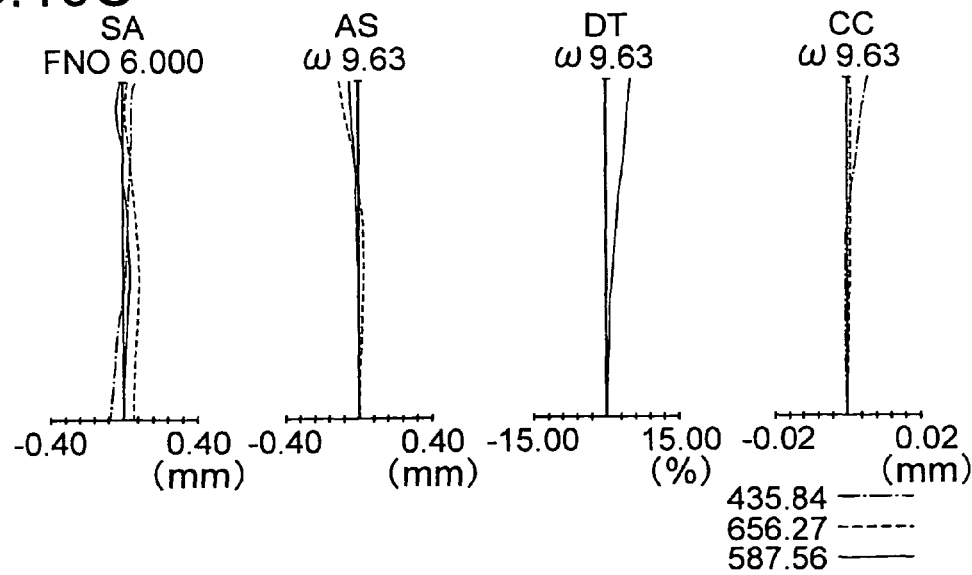

As shown in FIGS. 5A, 5B, and 5C, the zoom lens according to the fifth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves toward the object side, and the third lens unit G3 moves toward the image side.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and biconcave negative lens, and a biconvex positive lens. The third lens unit G3 is composed of a biconvex positive lens. All the lens elements in each lens unit G1, G2, G3 are arranged in the mentioned order from the object side.

The following seven lens surfaces are aspheric surfaces: both surfaces of the biconcave lens in the first lens unit G1, both surfaces of the positive meniscus lens in the first lens unit G1, both surfaces of the biconvex positive lens closest to the object side in the second lens unit G2, and the image side surface of the biconvex positive lens in the third lens unit G3.

Numerical data of each embodiment described above is shown below. Apart from symbols described above, f denotes a focal length of the entire zoom lens system, $F_{NO}$ denotes an F number, $\omega$ denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

Focusing is performed by a movement of the third lens unit. When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Example 1

| unit mm | | | | |
|---|---|---|---|---|
| Surface data | | | | |
| Surface No | r | d | nd | vd |
| Object plane | ∞ | ∞ | | |
| 1* | −500.000 | 0.70 | 1.85135 | 40.10 |
| 2* | 5.921 | 1.90 | | |
| 3* | 17.188 | 1.73 | 2.10220 | 16.80 |
| 4* | 67.084 | Variable | | |
| 5(S) | ∞ | 0.00 | | |
| 6* | 5.295 | 2.40 | 1.51633 | 64.14 |

-continued unit mm

| | | | | |
|---|---|---|---|---|
| 7 | 21.396 | 0.50 | 1.90366 | 31.32 |
| 8 | 4.929 | 2.15 | 1.56883 | 56.36 |
| 9 | −24.678 | 0.10 | | |
| 10 | 11.351 | 1.57 | 1.49700 | 81.54 |
| 11* | −51.004 | Variable | | |
| 12* | −3.400 | 1.00 | 1.49700 | 81.54 |
| 13 | −5.582 | Variable | | |
| 14 | ∞ | 0.50 | 1.53996 | 59.45 |
| 15 | ∞ | 0.50 | | |
| 16 | ∞ | 0.49 | 1.51633 | 64.14 |
| 17 | ∞ | 0.36 | | |
| Image plane | ∞ | | | |

Aspherical coefficients

1st surface

K = 0.000
A4 = −2.87813e−04, A6 = 2.47626e−05, A8 = −6.27904e−07,
A10 = 4.84460e−09

2nd surface

K = 0.000
A4 = −1.04797e−03, A6 = 2.14391e−05, A8 = 3.92387e−07,
A10 = −4.18151e−08

3rd surface

K = 0.000
A4 = −8.74780e−04

4th surface

K = 0.000
A4 = −7.87833e−04

6th surface

K = −0.361
A4 = −3.40502e−04, A6 = 5.75448e−06, A8 = −2.15507e−07

12th surface

K = −0.348
A4 = −7.14649e−04, A6 = −2.69680e−05, A8 = −6.73354e−06,
A10 = 5.90625e−07

Zoom data

| | WE | ST | TE |
|---|---|---|---|
| IH | 3.84 | 3.84 | 3.84 |
| focal length | 5.00 | 11.50 | 21.74 |
| Fno. | 2.84 | 4.09 | 6.00 |
| 2ω (°) | 85.04 | 37.53 | 20.02 |
| BF | 2.25 | 6.70 | 13.13 |
| total length | 37.57 | 30.18 | 32.82 |
| d4 | 16.91 | 4.67 | 0.10 |
| d11 | 6.35 | 6.76 | 7.54 |
| d13 | 0.75 | 5.19 | 11.62 |

Unit focal length

| | | |
|---|---|---|
| f1 = −11.69 | f2 = 8.90 | f3 = −20.65 |

Example 2 unit mm

Surface data

| Surface No | r | d | nd | νd |
|---|---|---|---|---|
| Object plane | ∞ | ∞ | | |
| 1* | −500.000 | 0.70 | 1.85135 | 40.10 |
| 2* | 5.860 | 1.90 | | |

-continued unit mm

| | | | | |
|---|---|---|---|---|
| 3* | 13.760 | 1.73 | 2.10220 | 16.80 |
| 4* | 33.656 | Variable | | |
| 5(S) | ∞ | 0.00 | | |
| 6* | 4.825 | 2.40 | 1.51633 | 64.14 |
| 7 | 15.418 | 0.50 | 1.90366 | 31.32 |
| 8 | 4.413 | 2.15 | 1.60738 | 56.81 |
| 9* | −13.268 | Variable | | |
| 10* | −3.400 | 1.00 | 1.49700 | 81.54 |
| 11 | −4.386 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.36 | | |
| Image plane | ∞ | | | |

Aspherical coefficients

1st surface

K = 0.000
A4 = −3.51426e−04, A6 = 3.64633e−05, A8 = −8.44796e−07,
A10 = 5.69497e−09

2nd surface

K = 0.000
A4 = −1.10927e−03, A6 = 3.99690e−05, A8 = 8.63183e−07,
A10 = −6.28724e−08

3rd surface

K = 0.000
A4 = −7.22676e−04, A6 = 7.30897e−06, A8 = −1.56744e−07,
A10 = −6.40406e−09

4th surface

K = 0.000
A4 = −6.53589e−04, A6 = 3.99974e−06, A8 = −1.88627e−07,
A10 = −4.86970e−09

6th surface

K = −0.345
A4 = −3.22516e−04, A6 = 2.22027e−06, A8 = 1.08211e−07

9th surface

K = 11.771
A4 = 1.00828e−03, A6 = 3.77184e−05, A8 = −1.37351e−06,
A10 = 3.89816e−07

10th surface

K = −0.399
A4 = −1.07359e−03, A6 = −8.54420e−05, A8 = 1.62897e−06,
A10 = −1.00663e−06

Zoom data

| | WE | ST | TE |
|---|---|---|---|
| IH | 3.60 | 3.60 | 3.60 |
| focal length | 5.00 | 11.50 | 21.74 |
| Fno. | 2.91 | 4.12 | 6.00 |
| 2ω (°) | 79.67 | 35.47 | 18.85 |
| BF | 3.62 | 8.97 | 16.68 |
| total length | 39.66 | 32.14 | 35.85 |
| d4 | 19.00 | 5.82 | 0.97 |
| d9 | 6.66 | 6.97 | 7.82 |
| d11 | 2.11 | 7.46 | 15.18 |

Unit focal length

| | | |
|---|---|---|
| f1 = −11.41 | f2 = 9.41 | f3 = −45.88 |

Example 3 unit mm

Surface data

| Surface No | r | d | nd | νd |
|---|---|---|---|---|
| Object plane | ∞ | ∞ | | |
| 1* | −500.000 | 0.70 | 1.85135 | 40.10 |
| 2* | 5.874 | 1.90 | | |
| 3* | 14.795 | 1.73 | 2.10220 | 16.80 |
| 4* | 40.470 | Variable | | |
| 5(S) | ∞ | 0.00 | | |
| 6* | 5.566 | 2.40 | 1.51633 | 64.14 |
| 7 | 22.306 | 0.50 | 1.90366 | 31.32 |
| 8 | 5.050 | 2.15 | 1.60738 | 56.81 |
| 9* | −23.492 | 0.10 | | |
| 10 | 15.155 | 1.57 | 1.49700 | 81.54 |
| 11 | −32.396 | Variable | | |
| 12* | −3.400 | 1.00 | 1.49700 | 81.54 |
| 13 | −5.534 | Variable | | |
| 14 | ∞ | 0.50 | 1.53996 | 59.45 |
| 15 | ∞ | 0.50 | | |
| 16 | ∞ | 0.49 | 1.51633 | 64.14 |
| 17 | ∞ | 0.36 | | |
| Image plane | ∞ | | | |

Aspherical coefficients

1st surface

K = 0.000
A4 = −3.20058e−04, A6 = 3.10909e−05, A8 = −7.92171e−07,
A10 = 6.10314e−09

2nd surface

K = 0.000
A4 = −1.12448e−03, A6 = 3.27663e−05, A8 = 8.21328e−07,
A10 = −5.94616e−08

3rd surface

K = 0.000
A4 = −8.00540e−04, A6 = 6.76366e−07

4th surface

K = 0.000
A4 = −7.01577e−04, A6 = −3.25633e−06

6th surface

K = −0.352
A4 = −3.72388e−04, A6 = 3.72034e−06, A8 = −2.32283e−07

9th surface

K = 0.000

12th surface

K = −0.313
A4 = −4.13323e−04, A6 = −2.24764e−05, A8 = −1.05345e−07,
A10 = −1.09212e−07

Zoom data

| | WE | ST | TE |
|---|---|---|---|
| IH | 3.84 | 3.84 | 3.84 |
| focal length | 5.00 | 11.50 | 21.73 |
| Fno. | 2.80 | 4.05 | 6.00 |
| 2ω (°) | 84.65 | 37.53 | 20.06 |
| BF | 1.60 | 5.95 | 12.51 |
| total length | 36.80 | 29.95 | 32.92 |
| d4 | 16.08 | 4.39 | 0.10 |
| d11 | 7.07 | 7.55 | 8.25 |
| d13 | 0.10 | 4.45 | 11.01 |

Unit focal length

| f1 = −11.44 | f2 = 8.90 | f3 = −21.01 |
|---|---|---|

Example 4 unit mm

Surface data

| Surface No | r | d | nd | νd |
|---|---|---|---|---|
| Object plane | ∞ | ∞ | | |
| 1* | −210.382 | 0.70 | 1.88300 | 40.76 |
| 2* | 5.789 | 1.70 | | |
| 3* | 10.450 | 1.73 | 2.01960 | 21.50 |
| 4* | 25.332 | Variable | | |
| 5(S) | ∞ | 0.00 | | |
| 6* | 4.601 | 2.40 | 1.51633 | 64.14 |
| 7 | 12.564 | 0.50 | 1.90366 | 31.32 |
| 8 | 4.208 | 2.15 | 1.60738 | 56.81 |
| 9* | −15.782 | Variable | | |
| 10* | −3.732 | 1.00 | 1.49700 | 81.54 |
| 11 | −5.294 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.36 | | |
| Image plane | ∞ | | | |

Aspherical coefficients

1st surface

K = 0.000
A4 = −3.54677e−04, A6 = 3.52730e−05, A8 = −8.75691e−07,
A10 = 6.80601e−09

2nd surface

K = 0.000
A4 = −1.07615e−03, A6 = 3.88899e−05, A8 = 8.22463e−07,
A10 = −6.49599e−08

3rd surface

K = 0.000
A4 = −4.41705e−04, A6 = 1.51983e−05, A8 = 3.99161e−08,
A10 = −1.42829e−09

4th surface

K = 0.000
A4 = −3.35156e−04, A6 = 1.06471e−05, A8 = −7.58852e−08,
A10 = 9.34243e−10

6th surface

K = −0.343
A4 = −2.33902e−04, A6 = −2.45066e−06, A8 = 8.94586e−07

9th surface

K = 12.523
A4 = 1.04221e−03, A6 = 2.99909e−05, A8 = −6.60241e−07,
A10 = 4.57366e−07

10th surface

K = −0.445
A4 = −8.04839e−04, A6 = −5.12295e−05, A8 = −1.58345e−06,
A10 = −2.72685e−07

Zoom data

| | WE | ST | TE |
|---|---|---|---|
| IH | 3.84 | 3.84 | 3.84 |
| focal length | 5.00 | 11.50 | 21.74 |
| Fno. | 2.82 | 4.05 | 6.00 |
| 2ω (°) | 84.43 | 37.71 | 20.09 |
| BF | 3.09 | 8.08 | 15.91 |
| total length | 39.10 | 31.36 | 34.83 |
| d4 | 19.26 | 6.23 | 1.50 |
| d9 | 6.57 | 6.87 | 7.25 |
| d11 | 1.59 | 6.58 | 14.40 |

-continued unit mm

Unit focal length

| f1 = −11.71 | f2 = 9.24 | f3 = −32.31 |

Example 5 unit mm

Surface data

| Surface No | r | d | nd | vd |
|---|---|---|---|---|
| Object plane | ∞ | ∞ | | |
| 1* | −52.328 | 0.70 | 1.85135 | 40.10 |
| 2* | 6.292 | 1.80 | | |
| 3* | 11.208 | 1.90 | 2.01960 | 21.50 |
| 4* | 32.675 | Variable | | |
| 5(S) | ∞ | 0.30 | | |
| 6* | 5.848 | 1.80 | 1.67790 | 50.72 |
| 7* | −116.074 | 0.30 | | |
| 8 | 8.654 | 1.75 | 1.77250 | 49.60 |
| 9 | −10.430 | 0.60 | 1.90366 | 31.32 |
| 10 | 4.370 | 0.80 | | |
| 11 | 14.178 | 1.10 | 1.53100 | 55.60 |
| 12 | −58.550 | Variable | | |
| 13 | 73.671 | 1.80 | 1.85135 | 40.10 |
| 14* | −20.517 | Variable | | |
| 15 | ∞ | 0.40 | 1.51633 | 64.14 |
| 16 | ∞ | 0.40 | | |
| 17 | ∞ | 0.40 | 1.51700 | 64.20 |
| 18 | ∞ | 0.36 | | |
| Image plane | ∞ | | | |

Aspherical coefficients

1st surface

K = 0.000
A4 = 9.99446e−05, A6 = −9.63628e−07, A8 = 2.04237e−10

2nd surface

K = −3.135
A4 = 5.89117e−04, A6 = 8.42873e−06, A8 = −2.01401e−07,
A10 = 4.25352e−10

3rd surface

K = 0.000
A4 = −6.52342e−04, A6 = 2.15344e−05, A8 = −2.39305e−07

4th surface

K = 0.000
A4 = −4.06555e−04, A6 = 1.37777e−05, A8 = −1.79159e−07

-continued unit mm

6th surface

K = 0.182
A4 = −4.09857e−04, A6 = 7.08265e−05, A8 = −9.43953e−06,
A10 = 7.54600e−07

7th surface

K = 0.000
A4 = 2.84443e−04, A6 = 9.45190e−05, A8 = −1.26285e−05,
A10 = 1.16903e−06

14th surface

K = 0.000
A4 = 4.47090e−04, A6 = −1.15034e−05, A8 = 1.76973e−07

Zoom data

| | WE | ST | TE |
|---|---|---|---|
| Ih | 3.84 | 3.84 | 3.84 |
| focal length | 4.49 | 9.80 | 21.56 |
| Fno. | 2.49 | 3.57 | 6.00 |
| 2ω (°) | 90.81 | 41.83 | 19.26 |
| bf | 4.56 | 4.38 | 3.88 |
| total length | 40.73 | 33.92 | 40.73 |
| d4 | 20.19 | 7.37 | 1.50 |
| d12 | 3.13 | 9.32 | 22.49 |
| d14 | 3.27 | 3.10 | 2.60 |

Unit focal length

| f1 = −13.00 | f2 = 11.02 | f3 = 19.02 |

FIGS. 6A through 10C are aberration diagrams of the zoom lenses according to the first to the fifth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 6A, 7A, 8A, 9A, and 10A, in the intermediate focal length state in FIGS. 6B, 7B, 8B, 9B, and 10B, and at the telephoto end in FIGS. 6C, 7C, 8C, 9C, and 10C. The sign "ω" in these diagrams represents half angle of view.

In the following, values corresponding to conditional expressions (1) to (10) are presented for the respective embodiments. Values of the image height under the electrical distortion correction are values at the wide angle end. In the image processing for distortion correction, −3% distortion is left at the wide angle end.

As to the distortion correction, values in the intermediate focal length state and at the telephoto end are the same as the aforementioned values at the wide angle end, and the redundant values will not be presented in the following.

| | Example 1 | Example 2 | Example 3 | Example 4 | Example 5 |
|---|---|---|---|---|---|
| (1) $nd_{11}$ | 1.85135 | 1.85135 | 1.85135 | 1.883 | 1.85135 |
| (2) $nd_{12}$ | 2.10219 | 2.10219 | 2.10219 | 2.0196 | 2.0196 |
| (3) $vd_1 - vd_2$ | 23.3 | 23.3 | 23.3 | 19.26 | 18.6 |
| (4) $(r_{1a} + r_{1b})/(r_{1a} - r_{1b})$ | 0.977 | 0.977 | 0.977 | 0.946 | 0.785 |
| (5) $\beta_{(t)}/\beta_{(w)}$ | 1.437 | 1.242 | 1.442 | 1.335 | 1.047 |
| (6) $(r_{2a} + r_{2b})/(r_{2a} - r_{2b})$ | −1.689 | −2.383 | −2.152 | −2.404 | −2.044 |
| (7) $P_{11}/P_{12}$ | −2.998 | −2.970 | −2.998 | −2.587 | −2.441 |
| (8) $f_t/f_w$ | 4.348 | 4.348 | 4.346 | 4.348 | 4.804 |
| (9) $G_{m3}/D_t$ | 0.328 | 0.361 | 0.328 | 0.364 | −0.016 |
| the image height under the electrical distortion correction (wide angle end) | 3.584 | 3.424 | 3.594 | 3.619 | 3.565 |

-continued

| | Example 1 | Example 2 | Example 3 | Example 4 | Example 5 |
|---|---|---|---|---|---|
| the total image angle under the electrical distortion correction (wide angle end) | 79.4 | 76 | 79.5 | 80 | 84.7 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

In the zoom lenses according to the embodiments, barrel occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

(Signal Processing for Correction of Chromatic Aberration of Magnification)

In electronic still cameras, an image of an object is generally separated into images of three primary colors or first, second, and third primary colors, and a color image is reproduced by superimposing the output signals of the respective colors by computation. In a case where the zoom lens has chromatic aberration of magnification, if the image with the first primary color light is taken as a reference, the positions at which the images with the second primary color light and the third primary color light are formed will be displaced from the position at which the image with the first primary color light is formed.

In order to electrically correct chromatic aberration of magnification of an image, the amounts of displacement of the image positions with the second primary color light and the third primary color light relative to the image position with the first primary color light are obtained in advance for each pixel of the image pickup element based on information on the aberration of the zoom lens. Then, coordinate transformation may be performed for each pixel of a picked up image in such a way that the displacement relative to the image position with the first primary color light is corrected. In a case, for example, where an image is composed of three primary color output signals of red (R), green (G), and blue (B), displacements in the R and B image positions from the G image position may be obtained for each pixel in advance, and coordinate transformation may be performed on the picked up image to correct or eliminate displacement from the G image position, and R and B signals after correction may be output.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

(Correction of Distortion)

Incidentally, when the zoom lens system of the present invention is used, a digital correction of distortion of an image is carried out electrically. A basic concept for the digital correction of the distortion of an image will be described below.

Figure 11:
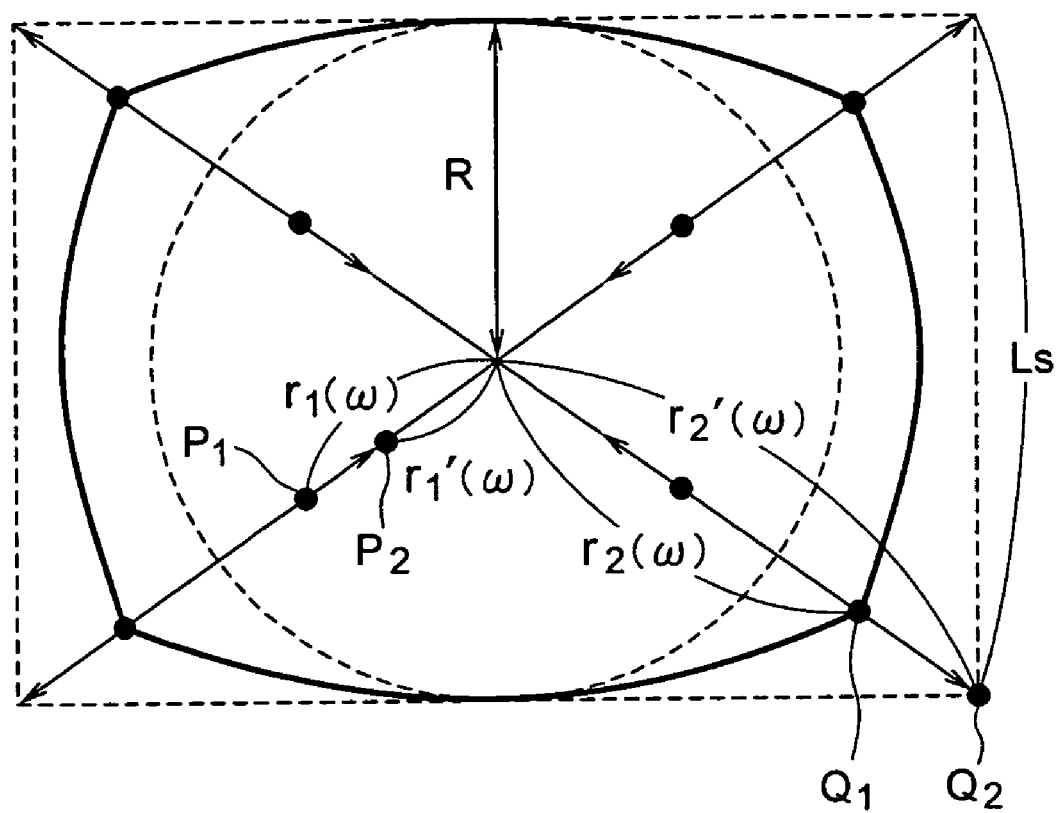
FIG. 11 is a diagram illustrating correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction.

Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 11, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2(ω)$ which is to be corrected, directed toward a direction away from the center of the circle.

Here, r' (ω) can be expressed as follows.

$$r'(ω) = α \cdot f \cdot \tan ω \quad (0 \leq α \leq 1)$$

where, ω is a half image angle of an object and f is a focal length of an imaging optical system (the zoom lens system in the present invention).

Here, when an ideal image height corresponding to a circle (image height) of radius R is let to be Y, then $$α = R/Y = R/(f \cdot \tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(ω) = α \cdot f \cdot \tan ω$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(ω) = α \cdot f \cdot \tan ω$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan ω$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$ In other words, when the focal length f of the imaging system, and the image height y are let to be fixed, a value of ω becomes large.

(Digital Camera)

Figure 12:
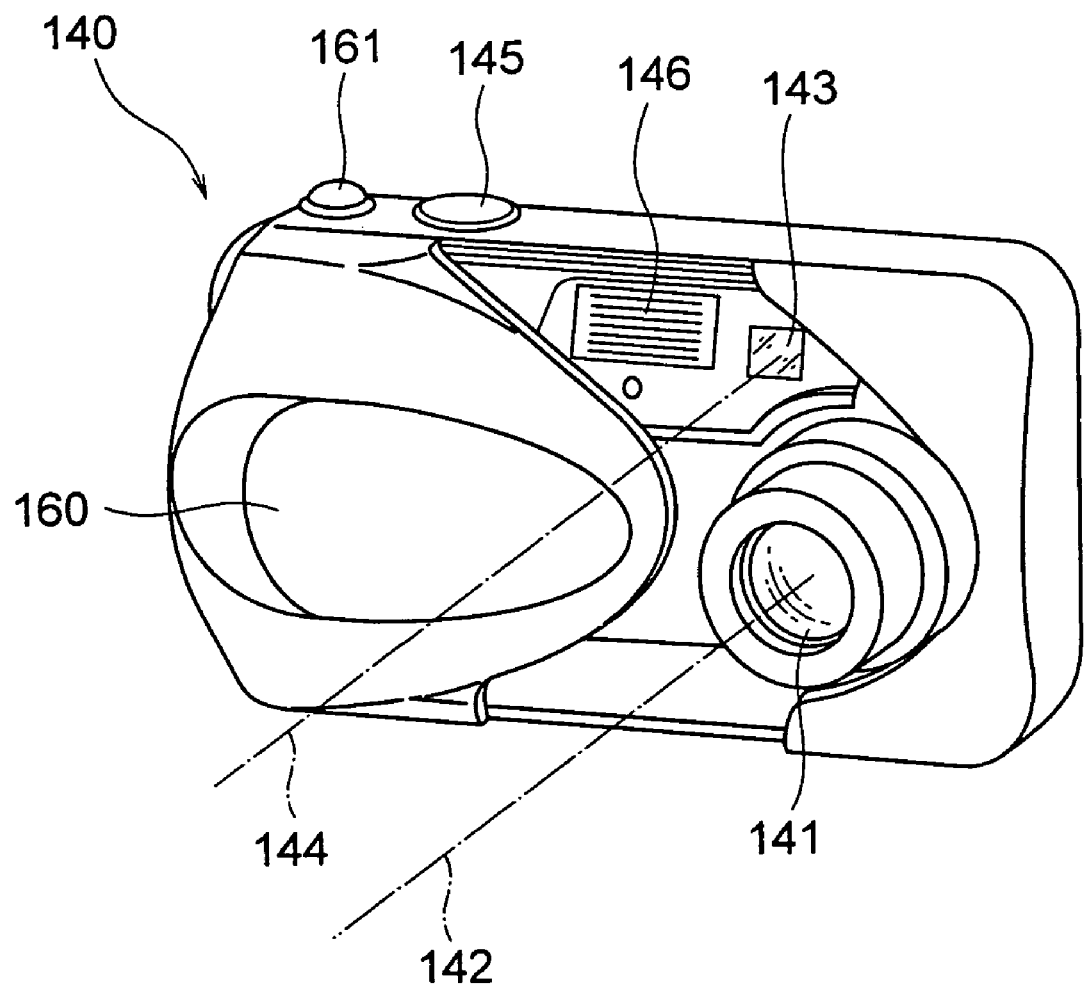
FIG. 12 is a front perspective view showing an outer appearance of a digital camera equipped with a collapsible zoom lens according to the present invention.
Figure 13:
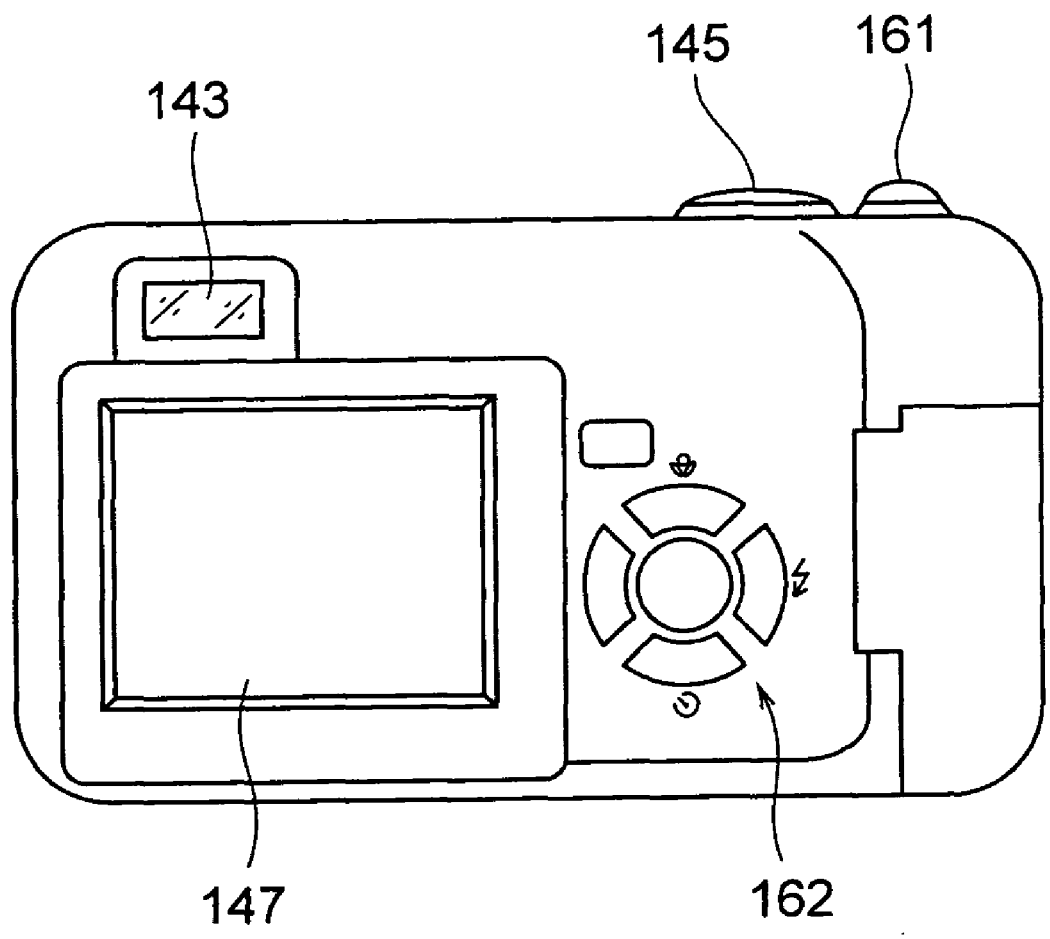
FIG. 13 is a rear perspective view of the digital camera.
Figure 14:
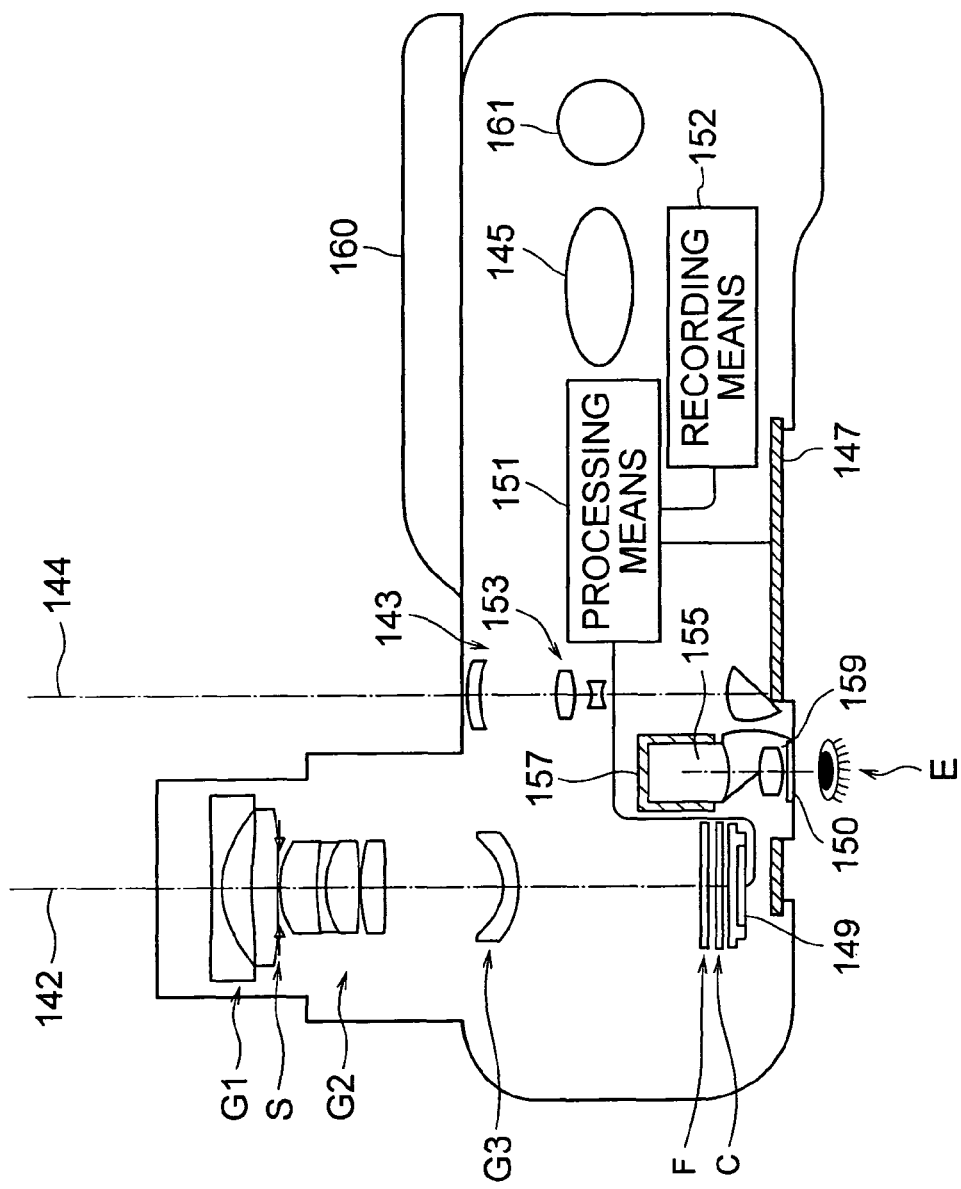
FIG. 14 is a cross sectional view of the digital camera.

FIG. 12 to FIG. 14 are conceptual diagrams of a structure of a digital camera according to the present invention in which a zoom lens system described above is incorporated in a taking optical system 141. FIG. 12 is a front perspective view showing an appearance of a digital camera 140, FIG. 13 is a rear view of the same, and FIG. 14 is a schematic cross-sectional view showing a structure of the digital camera 140. In FIG. 12 and FIG. 14, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 20, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 15 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 15, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the zoom lens according to the present invention is advantageous in cases where good optical performance is to be achieved in a zoom lens that is small in size and has a wide angle of view and a high zoom ratio.

What is claimed is:

1. A zoom lens comprising, in order from its object side:
a first lens unit having a negative refracting power;
a second lens unit having a positive refracting power; and
a third lens unit having a refracting power,
wherein:
during zooming from the wide angle end to the telephoto end, a distance between the first lens unit and the second lens unit decreases, a distance between the second lens unit and the third lens unit changes,
the first lens unit comprises, in order from the object side, a first lens element, which is a negative lens element, and a second lens element, which is a positive lens element,
the negative lens element and the positive lens element satisfies the following conditional expressions (2) and (3):

$$2.01 < nd_{12} < 2.35 \qquad (2)$$

$$18.58 < vd_{11} - vd_{12} < 50 \qquad (3),$$

where $nd_{12}$ is a refractive index of the second lens element in the first lens unit for the d-line, $vd_{11}$ is an Abbe number of the first lens element in the first lens unit with respect to the d-line, and $vd_{12}$ is an Abbe number of the second lens element in the first lens unit with respect to the d-line,
the zoom lens satisfies the following condition (8):

$$3.8 < f_t/f_w < 10 \qquad (8)$$

where $f_w$ is a focal length of the zoom lens at the wide angle end, and $f_t$ is a focal length of the zoom lens at the telephoto end, and
the third lens unit has a negative refracting power and is located closer to the object side at the telephoto end than at the wide angle end.

2. The zoom lens according to claim 1, wherein the zoom lens satisfies the following conditional expression (1):

$$1.85 < nd_{11} < 2.35 \qquad (1),$$

where $nd_{11}$ is the refractive index of the first lens element in the first lens unit for the d-line.

3. The zoom lens according to claim 1, wherein the first lens has a shape that satisfies the following conditional expression (4):

$$0.2 < (r_{1a} + r_{1b})/(r_{1a} - r_{1b}) < 1.0 \qquad (4)$$

where $r_{1a}$ is a paraxial radius of curvature of an object side lens surface of the first lens element, and $r_{1b}$ is a paraxial radius of curvature of an image side lens surface of the first lens element.

4. The zoom lens according to claim 1, wherein the third lens unit moves during zooming from the wide angle end to the telephoto end in such a way as to satisfy the following conditional expression (5):

$$1.05 < \beta(t)/\beta(w) < 2.0 \qquad (5)$$

where $\beta(w)$ is a lateral magnification of the third lens unit at the wide angle end, and $\beta(t)$ is a lateral magnification of the third lens unit at the telephoto end.

5. The zoom lens according to claim 1, wherein the total number of lens elements included in the third lens unit is one.

6. The zoom lens according to claim 1, wherein the second lens unit includes at least two positive lens elements and one negative lens element.

7. The zoom lens according to claim 1, wherein the second lens unit includes a cemented lens in which a plurality of lens elements are cemented together on the optical axis.

8. The zoom lens according to claim 1, wherein a lens surface closest to the object side in the second lens unit is an aspheric surface.

9. The zoom lens according to claim 1, wherein the first lens unit comprises, in order from the object side, the first lens element and the second lens element, the total number of lens elements included in the first lens unit is two, and the zoom lens satisfies the following conditional expression (6):

$$-3.0 < (r_{2a} + r_{2b})/(r_{2a} - r_{2b}) < -1.2 \qquad (6)$$

where $r_{2a}$ is a paraxial radius of curvature of an object side lens surface of the second lens element in the first lens unit, and $r_{2b}$ is a paraxial radius of curvature of an image side lens surface of the second lens element in the first lens unit.

10. The zoom lens according to claim 9, wherein the second lens element in the first lens unit has an aspheric surface, and the first lens unit satisfies the following conditional expression (7):

$$-2.9 < P_{11}/P_{12} < -1.5 \qquad (7)$$

where $P_{11}$ is a refracting power of the first lens element in the first lens unit, and $P_{12}$ is a refracting power of the second lens element in the first lens unit.

11. The zoom lens according to claim 1, wherein the third lens unit satisfies the following conditional expression (9):

$$0.1 < G_{m3}/D_t < 0.6 \qquad (9),$$

where $G_{m3}$ is a movement amount of the third lens unit during zooming from the wide angle end to the telephoto end, wherein movement toward the object side is represented by a positive value, and $D_t$ is an entire length of the zoom lens at the telephoto end.

12. The zoom lens according to claim 1, wherein anti-reflection coating is applied on at least one surface of a lens among the lenses that constitute the zoom lens.

13. An image pickup apparatus comprising:
a zoom lens according to claim 1, and
an image pickup element disposed on the image side of the zoom lens to convert an optical image formed by the zoom lens into an electrical signal.

14. The image pickup apparatus according to claim 13, comprising an image transformation section that transforms, by image processing, the electrical signal representing an image containing distortion attributed to the zoom lens into an image signal representing an image in which distortion is corrected.

15. The image pickup apparatus according to claim 13, comprising an image transformation section that transforms, by image processing, the electrical signal representing an image containing chromatic aberration of magnification attributed to the zoom lens into an image signal representing an image in which chromatic aberration of magnification is corrected.

16. A zoom lens comprising, in order from its object side:
a first lens unit having a negative refracting power;
a second lens unit having a positive refracting power; and
a third lens unit having a refracting power,
wherein:
during zooming from the wide angle end to the telephoto end, a distance between the first lens unit and the second lens unit decreases, a distance between the second lens unit and the third lens unit changes,
the first lens unit comprises, in order from the object side, a first lens element, which is a negative lens element, and a second lens element, which is a positive lens element,
the negative lens element and the positive lens element satisfies the following conditional expressions (2) and (3):

$$2.01 < nd_{12} < 2.35 \tag{2}$$

$$18.58 < vd_{11} - vd_{12} < 50 \tag{3},$$

where $nd_{12}$ is a refractive index of the second lens element in the first lens unit for the d-line, $vd_{11}$ is an Abbe number of the first lens element in the first lens unit with respect to the d-line, and $vd_{12}$ is an Abbe number of the second lens element in the first lens unit with respect to the d-line,
the second lens unit comprises three positive lens elements and one negative lens element, and the total number of lens elements included in the second lens unit is four, and
the third lens unit has a negative refracting power and is located closer to the object side at the telephoto end than at the wide angle end.

* * * * *